(12) United States Patent
Takanohashi et al.

(10) Patent No.: US 9,495,911 B2
(45) Date of Patent: Nov. 15, 2016

(54) DISPLAY PANEL, DRIVING METHOD, AND ELECTRONIC APPARATUS

(71) Applicant: Sony Corporation, Tokyo (JP)

(72) Inventors: Kazukuni Takanohashi, Kanagawa (JP); Hideyuki Suzuki, Kanagawa (JP); Kazunori Yasuda, Tokyo (JP); Toshiyuki Miyauchi, Kanagawa (JP); Tamotsu Ikeda, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 14/533,532

(22) Filed: Nov. 5, 2014

(65) Prior Publication Data
US 2015/0154905 A1    Jun. 4, 2015

(30) Foreign Application Priority Data

Dec. 4, 2013   (JP) ................................. 2013-250779

(51) Int. Cl.
| | | |
|---|---|---|
| G09G 5/00 | (2006.01) | |
| G09G 3/32 | (2016.01) | |
| G06F 3/14 | (2006.01) | |

(52) U.S. Cl.
CPC .......... *G09G 3/3275* (2013.01); *G09G 3/3225* (2013.01); *G06F 3/1446* (2013.01); *G09G 2300/026* (2013.01); *G09G 2300/0452* (2013.01); *G09G 2310/0283* (2013.01); *G09G 2310/08* (2013.01); *G09G 2320/0626* (2013.01); *G09G 2360/142* (2013.01); *G09G 2370/10* (2013.01); *G09G 2370/18* (2013.01)

(58) Field of Classification Search
CPC ............. G09G 3/3225; G09G 3/3275; G09G 2300/026; G09G 2300/0452; G09G 2310/08; G09G 2310/0283; G09G 2320/0626; G09G 2360/142; G09G 2370/10; G09G 2370/18

USPC ............. 345/76, 77, 82, 173, 204–214, 519, 345/591, 694, 699; 715/705; 348/476, 790; 386/241
See application file for complete search history.

(56) References Cited

U.S. PATENT DOCUMENTS

| | | | | |
|---|---|---|---|---|
| 5,796,441 A | * | 8/1998 | Oshita ..................... | G06T 9/007 348/476 |
| 6,992,788 B2 | * | 1/2006 | Fujiwara ................. | G06T 9/005 358/1.1 |
| 7,280,112 B1 | * | 10/2007 | Hutchins ............... | G06F 9/3001 345/530 |
| 7,659,909 B1 | * | 2/2010 | Hutchins ............... | G06F 9/3001 345/506 |
| 8,374,383 B2 | * | 2/2013 | Long ....................... | G06K 7/14 382/100 |
| 8,736,624 B1 | * | 5/2014 | Mahan .................. | G06T 15/005 345/522 |
| 2004/0056854 A1 | * | 3/2004 | Kondo ..................... | G09G 3/20 345/204 |

(Continued)

FOREIGN PATENT DOCUMENTS

JP     2012-032828     2/2012

*Primary Examiner* — Prabodh M Dharia
(74) *Attorney, Agent, or Firm* — Michael Best & Friedrich LLP

(57) ABSTRACT

A display panel includes: a driver section configured to generate a first pixel packet including digital luminance data; a plurality of unit pixels successively connected, each of the unit pixels configured to perform a display operation, based on the digital luminance data of the first pixel packet, and one or more of the unit pixels configured to perform a detection operation of a physical quantity thereof to generate a second pixel packet including digital detection data acquired by the detection operation and then output the second pixel packet to a subsequent one of the unit pixels; and a receiver section configured to receive the second pixel packet.

9 Claims, 26 Drawing Sheets

(56) References Cited

U.S. PATENT DOCUMENTS

| | | | |
|---|---|---|---|
| 2005/0062711 A1* | 3/2005 | Kobayashi | G09G 3/20 345/100 |
| 2005/0111724 A1* | 5/2005 | Macy | G06M 1/101 382/141 |
| 2006/0033879 A1* | 2/2006 | Covannon | G02B 27/017 351/221 |
| 2006/0250408 A1* | 11/2006 | Xu | G06T 15/04 345/582 |
| 2007/0091111 A1* | 4/2007 | Gutta | H04N 5/58 345/591 |
| 2007/0110290 A1* | 5/2007 | Chang | G06T 5/001 382/128 |
| 2008/0068390 A1* | 3/2008 | Ishii | G09G 3/2096 345/519 |
| 2008/0092043 A1* | 4/2008 | Trethewey | G06F 1/1626 715/705 |
| 2008/0143655 A1* | 6/2008 | Ko | G09G 3/3291 345/82 |
| 2008/0158443 A1* | 7/2008 | Shiomi | G09G 3/3648 348/790 |
| 2008/0170062 A1* | 7/2008 | Ma | G06F 1/04 345/214 |
| 2008/0278598 A1* | 11/2008 | Greenberg | G06T 1/20 348/222.1 |
| 2011/0074722 A1* | 3/2011 | Park | G06F 3/0418 345/173 |
| 2011/0222082 A1* | 9/2011 | Tomi | H04N 1/3877 358/1.9 |
| 2011/0268352 A1* | 11/2011 | Tomi | H04N 19/176 382/162 |
| 2011/0268355 A1* | 11/2011 | Ushiku | H04N 1/64 382/166 |
| 2011/0299767 A1* | 12/2011 | Ichikawa | H04N 19/176 382/162 |
| 2011/0299831 A1* | 12/2011 | Toma | G11B 27/322 386/241 |
| 2012/0278505 A1* | 11/2012 | Hardt | G08G 1/09623 709/246 |
| 2013/0090850 A1* | 4/2013 | Mays | G01C 21/36 701/533 |
| 2015/0061979 A1* | 3/2015 | Suzuki | G09G 3/2088 345/76 |
| 2015/0062204 A1* | 3/2015 | Takanohashi | G09G 3/3208 345/694 |
| 2015/0062294 A1* | 3/2015 | Sibley | G02B 27/2292 348/43 |
| 2015/0078757 A1* | 3/2015 | Pederson | H04B 1/385 398/118 |
| 2015/0371591 A1* | 12/2015 | Suzuki | G09G 3/32 345/208 |

* cited by examiner

DISPLAY PANEL, DRIVING METHOD, AND ELECTRONIC APPARATUS

CROSS REFERENCE TO RELATED APPLICATIONS

This application claims the benefit of Japanese Priority Patent Application JP2013-250779 filed Dec. 4, 2013, the entire contents which are incorporated herein by reference.

BACKGROUND

The present disclosure relates to a display panel configured to display an image, a method of driving such a display panel, and an electronic apparatus including such a display panel.

Recently, in the field of display panels configured to display an image, display panels (organic EL (Electro Luminescence) display panels) using, as light-emitting devices, current drive type optical devices with luminance changeable according to a value of a current flowing therethrough, for example, organic EL devices have been developed for commercialization. Unlike liquid crystal devices and the like, the organic EL devices are self-luminous devices; therefore, in the organic EL devices, a light source (a backlight) is not necessary. Accordingly, the organic EL display panels have characteristics such as higher image visibility, lower power consumption, and higher response speed of a device, compared to liquid crystal display panels needing a light source.

For example, Japanese Unexamined Patent Application Publication No. 2012-32828 discloses a so-called active matrix display panel in which a thin film transistor (TFT) is provided to each pixel to control light emission of an organic EL device in each pixel. This display panel includes a plurality of gate lines extending along a horizontal direction and a plurality of data lines extending along a vertical direction, and respective pixels are disposed around respective intersections of the gate lines and the data lines. Then, the pixels are selected line by line, based on a gate line signal, and an analog pixel voltage is written to the selected pixels.

SUMMARY

Display panels are used in various applications such as monitors of personal computers, televisions, and portable electronic apparatuses typified by smartphones. In such a case, the display panels may be desired to have a large number of functions. More specifically, the display panels may be desired to function as, for example, an input interface in addition to an output interface for a user. Moreover, the display panels may be desired to have, for example, a function of further enhancing image quality.

It is desirable to provide a display panel capable of achieving a large number of functions, a driving method, and an electronic apparatus.

According to an embodiment of the present disclosure, there is provided a display panel including: a driver section configured to generate a first pixel packet including digital luminance data; a plurality of unit pixels successively connected, each of the unit pixels configured to perform a display operation, based on the digital luminance data of the first pixel packet, and one or more of the unit pixels configured to perform a detection operation of a physical quantity thereof to generate a second pixel packet including digital detection data acquired by the detection operation and then output the second pixel packet to a subsequent one of the unit pixels; and a receiver section configured to receive the second pixel packet.

According to an embodiment of the present disclosure, there is provided a driving method including: generating a first pixel packet including digital luminance data; and performing, by each of a plurality of unit pixels successively connected, a display operation, based on the digital luminance data of the first pixel packet, and performing, by one or more of the plurality of unit pixels, a detection operation of a physical quantity thereof to generate a second pixel packet including digital detection data acquired by the detection operation, and then outputting the second pixel packet to a subsequent one of the unit pixels.

According to an embodiment of the present disclosure, there is provided an electronic apparatus provided with a display panel and a control section configured to perform operation control on the display panel, the display panel including: a driver section configured to generate a first pixel packet including digital luminance data; a plurality of unit pixels successively connected, each of the unit pixels configured to perform a display operation, based on the digital luminance data of the first pixel packet, and one or more of the unit pixels configured to perform a detection operation of a physical quantity thereof to generate a second pixel packet including digital detection data acquired by the detection operation and then output the second pixel packet to a subsequent one of the unit pixels; and a receiver section configured to receive the second pixel packet. The electronic apparatus may correspond to, for example, a personal computer, a monitor, a television, a smartphone, a digital camera, a video camera, or the like.

In the display panel, the driving method, and the electronic apparatus according to the embodiments of the present disclosure, the display operation is performed by each of the unit pixels, based on the digital luminance data of the first pixel packet. At this time, one or more of the unit pixels generate the second pixel packet including digital detection data.

In the display panel, the driving method, and the electronic apparatus according to the embodiments of the present disclosure, the unit pixel generates the second pixel packet; therefore, a large number of functions are allowed to be achieved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the technology, and are incorporated in and constitute a part of this specification. The drawings illustrate embodiments and, together with the specification, serve to explain the principles of the technology.

DETAILED DESCRIPTION

Some embodiments of the present disclosure will be described in detail below referring to the accompanying drawings. It is to be noted that description will be given in the following order.

1. First Embodiment
2. Second Embodiment
3. Third Embodiment
4. Fourth Embodiment
5. Application Examples

1. First Embodiment

Configuration Example

Entire Configuration Example

Figure 1:
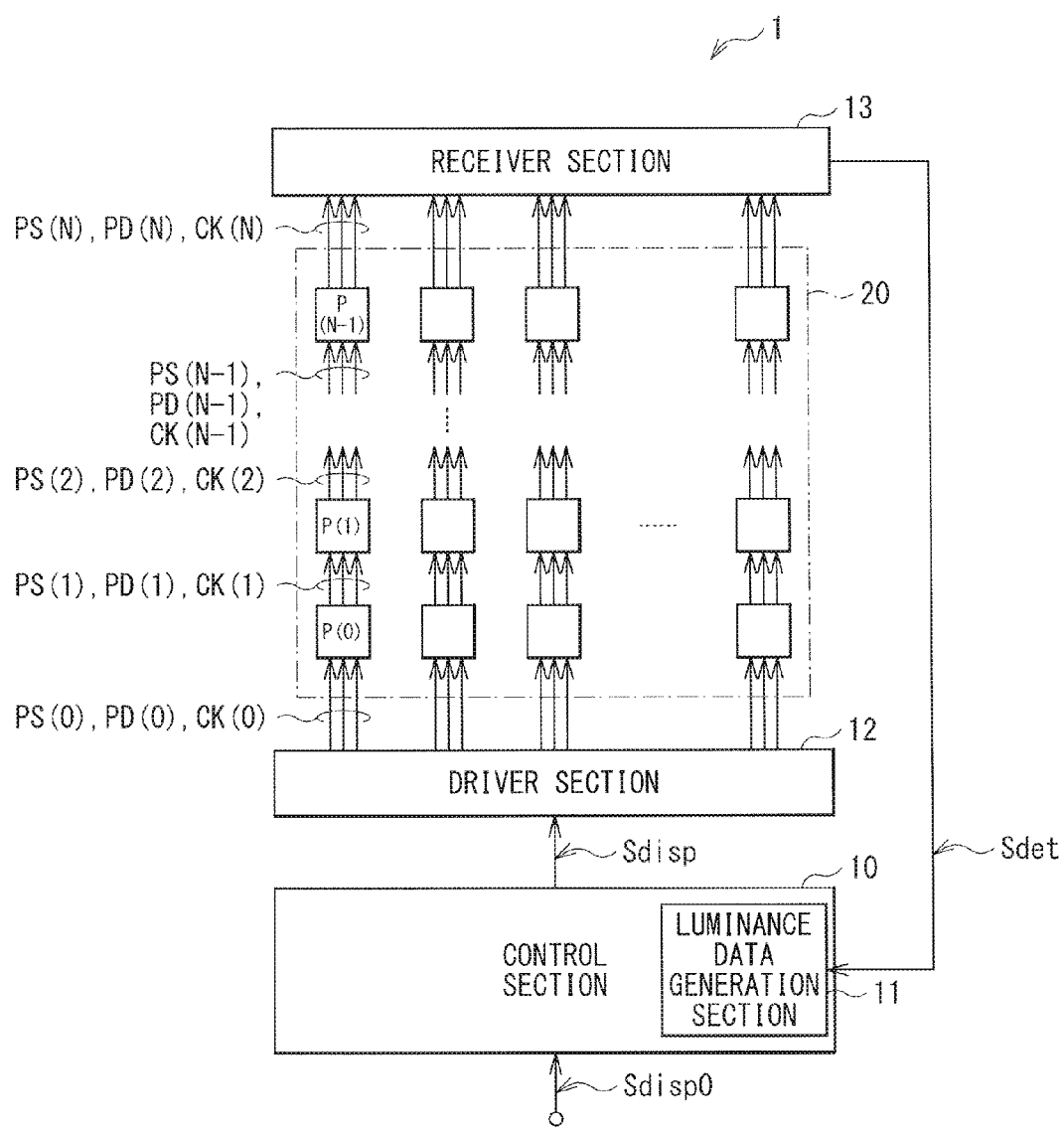
FIG. 1 is a block diagram illustrating a configuration example of a display panel according to a first embodiment of the present disclosure.

FIG. 1 illustrates a configuration example of a display panel according to a first embodiment. A display panel 1 is a display panel capable of displaying an image and detecting light. It is to be noted that a driving method and an electronic apparatus according to embodiments of the present disclosure are embodied by this embodiment, and will be also described below. The display panel 1 includes a control section 10, a driver section 12, a display section 20, and a receiver section 13.

The control section 10 is configured to control an operation of the entire display panel 1, based on an image signal Sdisp0. The image signal Sdisp0 includes luminance data ID (that will be described later) configured to define a luminance of each of pixels P (that will be described later) of the display section 20. The control section 10 is configured to generate various signals, such as various kinds of synchronization signals, necessary for an operation of the driver section 12, based on the image signal Sdisp0 and supply these signals together with the luminance data ID as an image signal Sdisp to the drive section 12.

The control section 10 includes a luminance data generation section 11. As will be described later, the luminance data generation section 11 is configured to generate luminance data ID, based on a detection signal Sdet supplied from the receiver section 13 and replace the luminance data ID supplied by the image signal Sdisp0 with the generated luminance data ID.

The driver section 12 is configured to control light emission of each of the pixels P (that will be described later) of the display section 20, based on the image signal Sdisp. More specifically, as will be described later, the display drive section 10 is configured to control light emission of each of the pixels P by supplying data signals PS and PD and a clock signal CK to each of pixel columns of the pixels P of the display section 20.

The display section 20 is configured to display an image, based on the data signals PS and PD and the clock signal CK and detect light. In other words, the display section 20 functions as an output interface for a user and an input interface.

In the display section 20, the pixels P are arranged in a matrix form. More specifically, although not illustrated, the pixels P are arranged in a matrix of M pixels wide (horizontal) by N pixels high (vertical). N number of pixels P (P(0) to P(N−1)) arranged side by side along a vertical direction are connected in a daisy chain fashion. The display drive section 10 supplies the data signals PS and PD (PS(0) and PD(0)) and the clock signal CK (CK(0)) to the pixel P(0) in a first stage of the N number of pixels P connected in a daisy chain fashion. The pixel P(0) generates the data signals PS and PD (PS(1) and PD(1)) and the clock signal CK (CK(1)), based on the data signals PS(0) and PD(0) and the clock signal CK(0), and supplies these signals to the pixel P(1) subsequent to the pixel P(0). The subsequent pixel P(1) generates the data signals PS and PD (PS(2) and PD(2)) and the clock signal CK (CK(2)), based on the data signals PS(1)

and PD(1) and the clock signal CK(1), and supplies these signals to the pixel P(2) subsequent to the pixel P(1). This is applicable to subsequent pixels P(2) to P(N−2). Then, the pixel P(N−1) in a last stage of the N number of pixels P generates the data signals PS and PD (PS(N) and PD(N)) and the clock signal CK (CK(N)), based on the data signal PS and PD (PS(N−1) and PD(N−1)) and the signal CK (CK(N−1)) that are generated by the pixel P(N−2) previous to the pixel P(N−1), and supplies these signals to the receiver section 13. Thus, the pixels P are connected in a daisy chain fashion with respect to the data signals PS and PD, and the pixels P are connected in a daisy chain fashion with respect to the clock signal CK.

Figure 2:
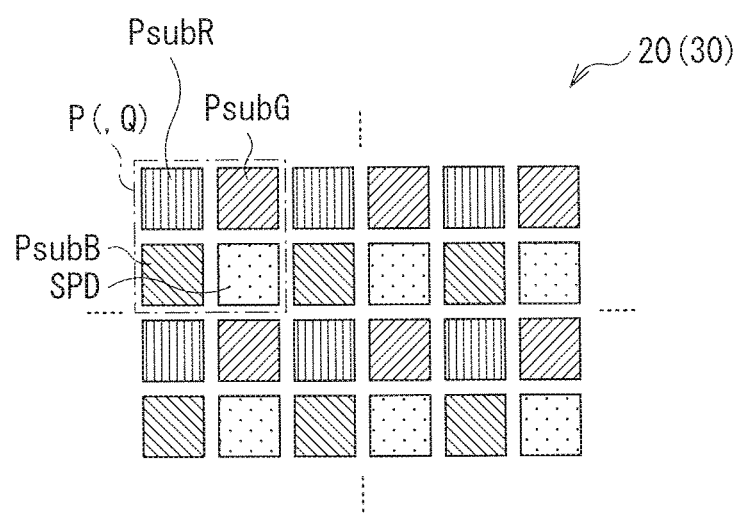
FIG. 2 is an explanatory diagram illustrating a configuration example of a display section illustrated in FIG. 1.

FIG. 2 illustrates a configuration example of the display section 20. Each of the pixels P includes three sub-pixels PsubR, PsubG, and PsubB, and a light sensor SPD. The sub-pixels PsubR, PsubG, and PsubB are configured to emit red light, green light, and blue light, respectively. The light sensor SPD is configured to detect light. By this configuration, each of the pixels P performs a display operation with use of three sub-pixels PsubR, PsubG, and PsubB, and performs a light detection operation with use of the light sensor SPD.

The data signal PD includes pixel packets PCT1 and PCT2 supplied to the N number of pixels P connected in a daisy chain fashion. The pixel packet PCT1 is configured to allow the pixel P to perform the display operation and the light detection operation, and the pixel packet PCT2 is configured to transfer a detection result obtained by the pixel P in the light detection operation. The pixel packets PCT1 and PCT2 will be described below.

Figure 3A:
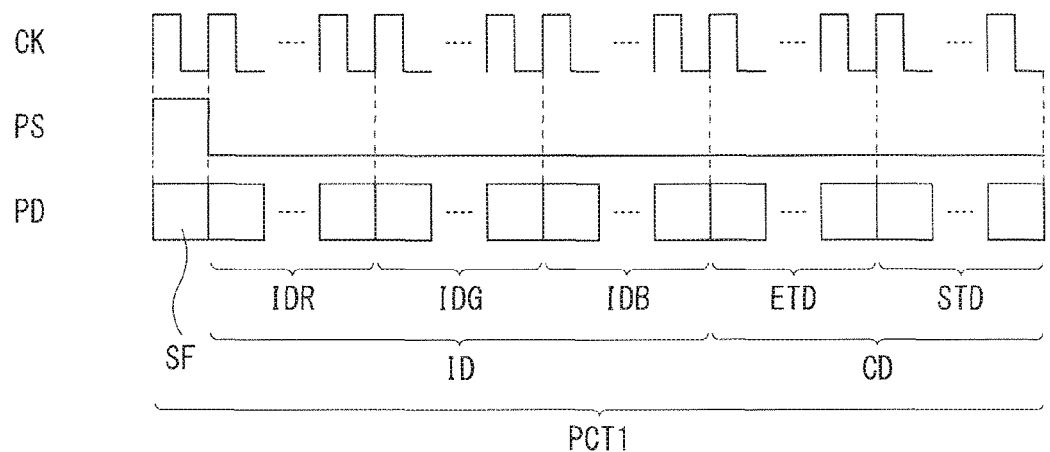
FIG. 3A is an explanatory diagram illustrating a configuration example of a pixel packet.

FIG. 3A illustrates a configuration example of the pixel packet PCT1. The pixel packet PCT1 includes luminance data ID, control data CD, and a start flag SF. The luminance data ID is configured to define a luminance of each pixel P. The luminance data ID includes luminance data IDR indicating a red (R) luminance, luminance data IDG indicating a green (G) luminance, and luminance data IDB indicating a blue (B) luminance. In this example, each of the luminance data IDR, IDG, and IDB is a code of a plurality of bits. The control data CD is configured to control an operation of each pixel P. More specifically, in this example, the control data CD includes light emission timing data ETD and detection timing data STD. The light emission timing data ETD is configured to define a light emission timing in each pixel P, and is a code of a plurality of bits. The detection timing data STD is configured to define a light detection start timing in each pixel P, and is a code of a plurality of bits. The start flag SF is configured to indicate the start of the pixel packet PCT1. The start flag SF is turned to "1" only in a first pixel packet of pixel packets that have not yet been read by any of the pixels P in a pixel packet group supplied to the N number of pixels P connected in a daisy chain fashion. In this example, the start flag SF, the luminance data ID, and the control data CD are arranged in this order in the pixel packet PCT1.

Figure 3B:
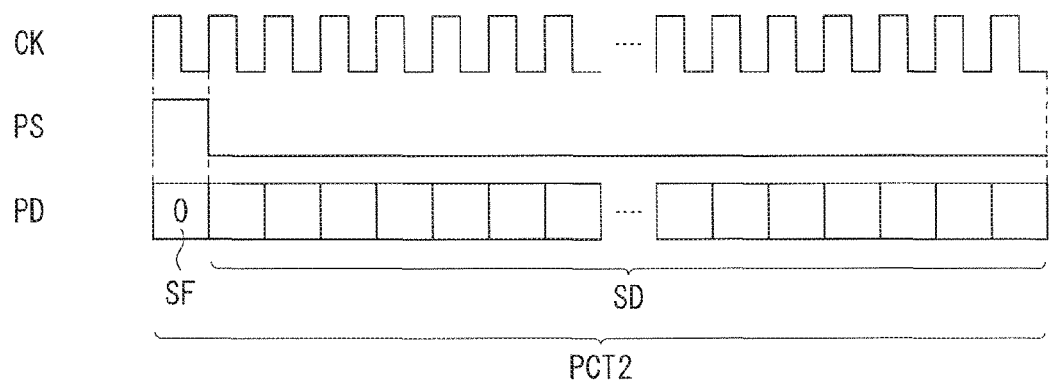
FIG. 3B is an explanatory diagram illustrating a configuration example of another pixel packet.

FIG. 3B illustrates a configuration example of the pixel packet PCT2. In this example, the pixel packet PCT2 is configured of the same number of bits as that of the pixel packet PCT1. The pixel packet PCT2 includes detection data SD and a start flag SF. The detection data SD is configured to indicate a detection result obtained by the light detection operation, and is a code of a plurality of bits. The start flag SF is set to "0". In this example, the start flag SF and the detection data SD are arranged in this order in the pixel packet PCT2.

As illustrated in FIGS. 3A and 3B, the data signal PS is a signal that is turned to "1" in a case where the data signal PD indicates the start flag SF, and is turned to "0" in other cases. In other words, the data signal PS is a signal that is turned to "1" at the start of each of the pixel packets PCT1 and PCT2.

The receiver section 13 acquires the detection data SD included in the pixel packet PCT2, based on the data signal PS(N) and PD(N) and the clock signal CK(N) supplied from the pixel P in a last stage of the display section 20. Then, the receiver section 13 supplies the detection data SD of all of the pixels P of the display section 20 as the detection signal Sdet to the control section 10.

Figure 4:
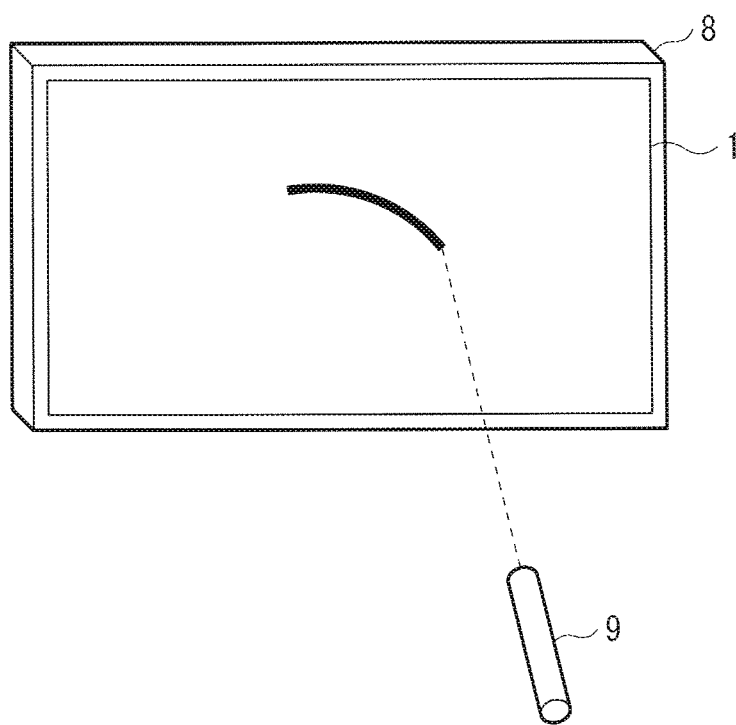
FIG. 4 is an explanatory diagram illustrating an operation example of the display panel illustrated in FIG. 1.

FIG. 4 illustrates an operation example of the display panel 1. In this example, a display unit 8 functioning as an electronic sign board is configured with use of the display panel 1. The display unit 8 is configured to display a graphic or the like drawn on a display screen by a user with use of a laser pointer 9. More specifically, each of the pixels P of the display section 20 performs the display operation, and detects light from the laser pointer 9 and then supplies a detection result to the receiver section 13. Then, the receiver section 13 supplies detection results of all of the pixels P of the display section 20 as the detection signal Sdet to the control section 10. The luminance data generation section 11 of the control section 10 generates the luminance data ID of the pixel P located in a position where light is detected, based on the detection signal Sdet, and replaces the luminance data ID corresponding to the pixel P of luminance data ID of one frame image supplied by the image signal Sdisp0 with the generated luminance data ID. Thus, the display panel 1 is allowed to display a superimposing of a frame image indicated by the image signal Sdisp0 and a graphic, a letter, or the like drawn by the user on the display screen with use of the laser pointer 9.

(Pixel P)

Figure 5:
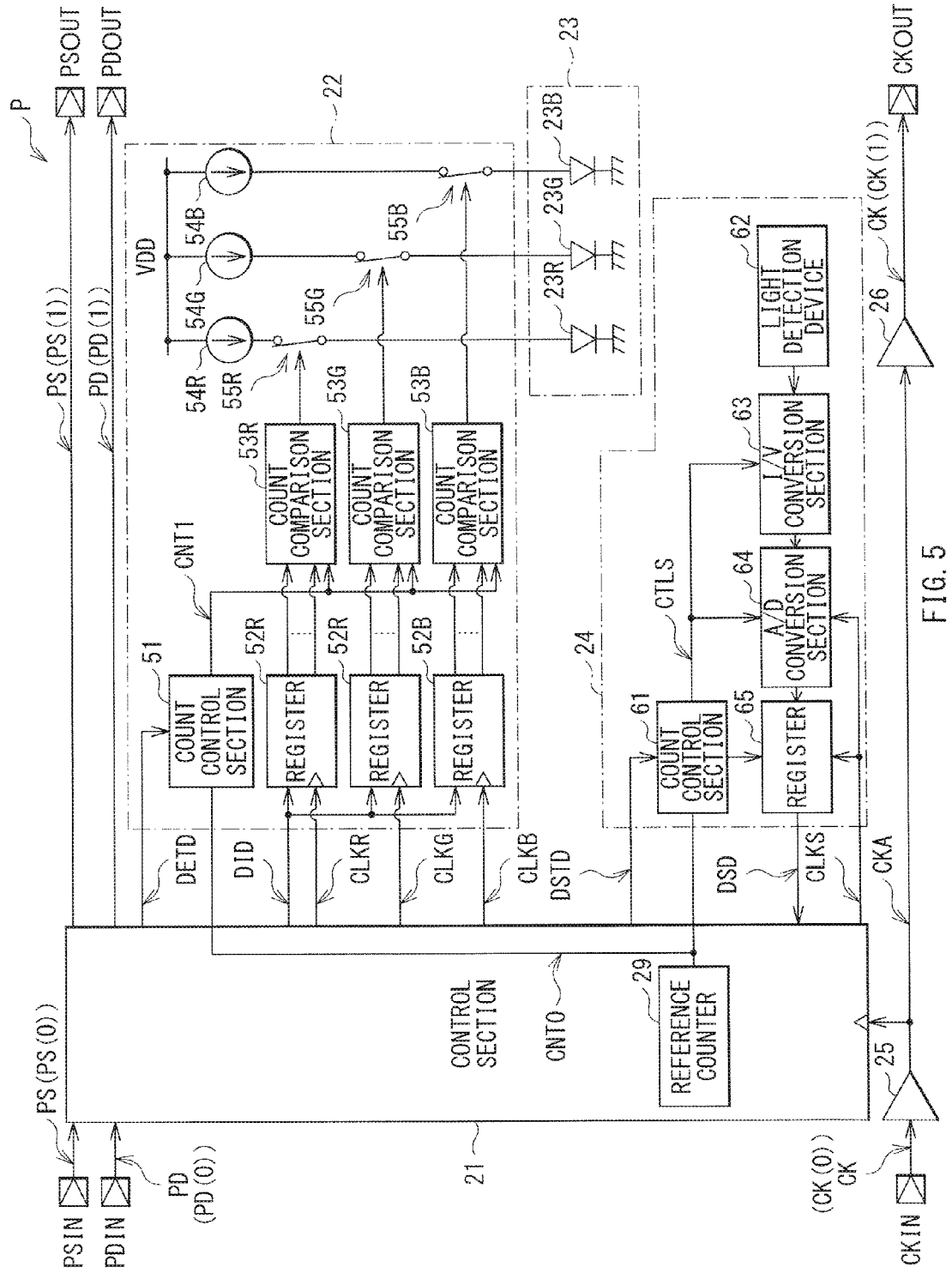
FIG. 5 is a block diagram illustrating a configuration example of a pixel illustrated in FIG. 1.

FIG. 5 illustrates a configuration example of the pixel P. The pixel P includes clock buffers 25 and 26, a control section 21, a light emission control section 22, a light emission section 23, and a light detection section 24. It is to be noted that, for convenience of description, the pixel P(0) in the first stage of the N number of pixels P connected in a daisy chain fashion will be described below as an example; however, other pixels P(1) to P(N−1) are similar to the pixel P(0).

The pixel P(0) generates the data signal PS(1) and PD(1) and the clock signal CK(1), based on the data signal PS(0) input to an input terminal PSIN, the data signal PD(0) input to an input terminal PDIN, and the clock signal CK(0) input to an input terminal CKIN. Then, the pixel P(0) outputs the data signal PS(1), the data signal PD(1), and the clock signal CK(1) from an output terminal PSOUT, an output terminal PDOUT, and an output terminal CKOUT, respectively.

The clock buffer 25 is configured to generate a clock signal CKA, based on the clock signal CK(0). The clock buffer 26 is configured to generate the clock signal CK(1), based on the clock signal CKA.

The control section 21 is configured to generate the data signals PS(1) and PD(1), based on the data signals PS(0) and PD(0) and the clock signal CKA. At this time, as will be described later, in a case where the pixel packets PCT1 and PCT2 in which the start flag SF is "0" are supplied to the control section 21, the control section 21 outputs the pixel packets PCT1 and PCT2 as-is. Moreover, in a case where the pixel packet PCT1 in which the start flag SF is "1" are supplied to the control section 21, the control section 21 reads the luminance data ID and the control data CD included in the pixel packet PCT1. A this time, the control section 21 generates the pixel packet 2 by changing the start flag SF of the pixel packet PCT1 into "0" and replacing the luminance data ID and the control data CD with the detection data SD, and then outputs the pixel packet 2. Moreover, the control section 21 sets the start flag SF in the subsequent pixel packet PCT1 to "1".

The control section 21 includes a reference counter 29. The reference counter 29 is configured to increment a count value CNT0 with time, and is a so-called base counter defining time in the pixel P. The reference counter 29 is initialized in a case where the start flag SF in the input pixel packet PCT1 is "1".

The control section 21 generates signals DID and DETD and clock signals CLKR, CLKG, and CLKB, and supplies these signals together with the count value CNT0 to the light emission control section 22. In this case, the signal DID includes the luminance data ID (luminance data IDR, IDG, and IDB), and the signal DETD includes light emission timing data ETD. The clock signals CLKR, CLKG, and CLKB are clock signals for supply of the luminance data IDR, IDG, and IDB to registers 52R, 52G, and 52B (that will be described later) of the light emission control section 22, respectively. Moreover, the control section 21 generates a signal DSTD and a clock signal CLKS, and supplies these signals together with the count value CNT0 to the light detection section 24, and receives a signal DSD from the light detection section 24. In this case, the signal DSTD includes detection timing data STD, the signal DSD includes detection data SD, and the clock signal CLKS is a clock signal for acquisition of the detection data SD from a register 65 (that will be described later) of the light detection section 24.

By this configuration, the control section 21 first initializes the reference counter 29 in a case where the start flag SF in the input pixel packet PCT1 is "1". Then, the control section 21 reads the luminance data ID and the control data CD following the start flag SF, and exchanges data with the light emission control section 22 and the light detection section 24. More specifically, the control section 21 supplies the luminance data ID to the light emission control section 22 with use of the signal DID and the clock signals CLKR, CLKG, and CLKB, and supplies the light emission timing data ETD included in the control data CD to the light emission control section 22 with use of the signal DETD. Moreover, the control section 21 supplies the detection timing data STD included in the control data CD to the light detection section 24 with use of the signal DSTD. Then, the control section 21 acquires the detection data SD from the light detection section 24 with use of the signal DSD and the clock signal CLKS, and generates the pixel packet PCT2 with use of the detection data SD.

The light emission control section 22 is configured to control a light emission operation in the light emission section 23. The light emission control section 22 includes a count control section 51, registers 52R, 52G, and 52B, count comparison sections 53R, 53G, and 53B, current sources 54R, 54G, and 54B, and switches 55R, 55G, and 55B.

The count control section 51 is configured to generate a count value CNT1, based on the count value CNT0 and the signal DETD. More specifically, the count control section 51 first acquires the light emission timing data ETD from the control section 21 through the signal DETD. Then, the count control section 51 keeps the count value CNT1 at an initial value (for example, "0") in a case where the count value CNT0 is equal to or smaller than a value of the light emission timing data ETD. The count control section 51 outputs a difference between the count value CNT0 and the light emission timing data ETD as the count value CNT1 in a case where the count value CNT0 is larger than the value of the light emission timing data ETD.

The register 52R is configured to hold the luminance data IDR included in the signal DID, based on the signal DID and the clock signal CLKR. The register 52G is configured to hold the luminance data IDG included in the signal DID, based on the signal DID and the clock signal CLKG. The register 52B is configured to hold the luminance data IDB included in the signal DID, based on the signal DID and the clock signal CLKB. Each of the registers 52R, 52G, and 52B may be configured of, for example, a shift register.

The count comparison section 53R is configured to generate a pulse signal having a pulse width according to the luminance data IDR by comparing the count value CNT1 with a value of the luminance data IDR stored in the register 52R. More specifically, the count comparison section 53R is configured to generate a pulse signal with a pulse width of a period from a timing at which the count value CNT1 starts incrementing from the initial value (for example, "0") to a timing at which the count value CNT1 reaches the value of the luminance data IDR. Likewise, the count comparison section 53G is configured to generate a pulse signal with a pulse width according to the luminance data IDG by comparing the count value CNT1 with a value of the luminance data IDG stored in the register 52G. Moreover, the count comparison section 53B is configured to generate a pulse signal with a pulse width according to the luminance data IDB by comparing the count value CNT1 with a value of the luminance data IDB stored in the register 52B.

Each of the current sources 54R, 54G, and 54B is a constant current source configured to generate a constant drive current. The switches 55R, 55G, and 55B are configured to be turned on or off, based on pulse signals supplied from the count comparison sections 53R, 53G, and 53B, respectively.

The light emission section 23 is configured to emit light, based on a drive current supplied from the light emission control section 22. The light emission section 23 includes light-emitting devices 23R, 23G, and 23B. The light-emitting devices 23R, 23G, and 23B correspond to the sub-pixels PsubR, PsubG, and PsubB illustrated in FIG. 2, respectively, and are configured to emit red (R) light, green (G) light, and blue (B) light, respectively. In this example, each of the light-emitting devices 23R, 23G, and 23B is configured with use of an LED (Light Emitting Diode).

By this configuration, the light-emitting devices 23R, 23G, and 23B emit light in periods with lengths corresponding to the luminance data IDR, IDG, and IDB, respectively. In other words, each pixel P is configured to express luminance gradation by lengths of light emission time of the light-emitting devices 23R, 23G, and 23B.

The light detection section 24 is configured to detect light and supply a detection result as the detection data SD to the control section 21. The light detection section 24 includes a count control section 61, a light detection device 62, an I/V conversion section 63, an A/D (Analog-to-Digital) conversion section 64, and a register 65.

The count control section 61 is configured to generate a detection control signal CTLS, based on the count value CNT0 and the signal DSTD. More specifically, the count control section 61 first acquires the detection timing data STD from the control section 21 through the signal DSTD. Then, the count control section 61 allows the detection control signal CTLS to be disabled in a case where the count value CNT0 is equal to or smaller than a value of the detection timing data STD. Then, the count control section 61 allows the detection control signal CTLS to be enabled in a predetermined period from a timing at which the count value CNT0 becomes larger than the value of the detection timing data STD.

The light detection device 62 is configured to output a current according to intensity of received light, and corresponds to the light sensor SPD illustrated in FIG. 2. In this example, the light detection device 62 is configured with use of a photodiode.

The I/V conversion section 63 is configured to convert a current signal (I) supplied from the light detection device 62 into an voltage signal (V) by integrating the current signal (I) in a period in which the detection control signal CTLS is enabled. Moreover, the I/V conversion section 63 is configured to reset an integration result in a period in which the detection control signal CTLS is disabled.

The A/D conversion section 64 is configured to sample the voltage signal (an analog signal) supplied from the I/V conversion section 63 and then convert the analog signal into a digital signal at a timing immediately before the detection control signal CTLS is changed from enabled to disabled. Then, the A/D conversion section 64 is configured to output the digital signal obtained by the conversion as the detection data SD.

The register 65 is configured to hold the detection data SD supplied from the A/D conversion section 64. Then, the register 65 is configured to supply the held detection data SD to the control section 21 with use of the signal DSD, based on the clock signal CLKS.

By this configuration, the light detection section 24 is configured to detect light in a period in which the detection control signal CTLS is enabled, generate the detection data SD according to a total amount of received light (an integration value) in the period, and then supply the detection data SD to the control section 21.

The pixel P corresponds to a specific example of "unit pixel" in an embodiment of the present disclosure. The pixel packet PCT1 corresponds to a specific example of "first pixel packet" in an embodiment of the present disclosure. The pixel packet PCT2 corresponds to a specific example of "second pixel packet" in an embodiment of the present disclosure. The start flag SF corresponds to a specific example of "flag data" in an embodiment of the present disclosure. The light emission timing data ETD corresponds to a specific example of "first control data" in an embodiment of the present disclosure. The detection timing data STD corresponds to a specific example of "second control data" in an embodiment of the present disclosure.

[Operation and Functions]

Next, an operation and functions of the display panel 1 according to this embodiment will be described below.

(Outline of Entire Operation)

First, an outline of an entire operation of the display panel 1 will be described below referring to FIG. 1 and the like. The control section 10 generates various signals necessary for an operation of the driver section 12, based on the image signal Sdisp0, and supplies these signals as the image signal Sdisp together with the luminance data ID to the driver section 12. At this time, the luminance data generation section 11 of the control section 10 generates the luminance data ID of the pixel P located in a position where light is detected, based on the detection signal Sdet supplied from the receiver section 13, and replaces the luminance data ID corresponding to the pixel P of luminance data ID of one frame image supplied by the image signal Sdisp0 with the generated luminance data ID. The driver section 12 supplies the data signals PS and PD and the clock signal CK to each of pixel columns of the pixels P of the display section 20, based on the image signal Sdisp. Each of the pixels P transfers the pixel packets PCT1 and PCT2 with use of the data signals PS and PD and the clock signal CK. At this time, when the pixel packets PCT1 and PCT2 in which the start flag SF is "0" are supplied to the pixel P, the pixel P supplies the pixel packets PCT1 and PCT2 as-is to the pixel P subsequent thereto. Moreover, when the pixel packet PCT1 in which the start flag SF is "1" is supplied to the pixel P, the pixel P reads the luminance data ID and the control data CD in the pixel packet PCT1. At this time, the pixel P changes the start flag SF of the pixel packet PCT1 into "0" and replaces the luminance data ID and the control data CD with the detection data SD to generate the pixel packet PCT2, and then supplies the generated pixel packet PCT2 to the pixel P subsequent thereto. Further, the pixel P sets the start flag SF in the pixel packet PCT1 subsequent thereto to "1". Each of the pixels P performs a display operation, based on the read luminance data ID and the read control data CD (light emission timing data ETD), and performs a light detection operation, based on the read control data CD (the detection timing data STD) to generate the detection data SD. The receiver section 13 acquires the detection data SD included in the pixel packet PCT2, based on the data signal PS(N) and PD(N) and the clock signal CK(N) supplied from the pixel P in a last stage, and supplies the detection data SD of all of the pixels P of the display section 20 as the detection signal Sdet to the control section 10.

(Transfer Operation of Pixel Packets PCT1 and PCT2)

Next, operations of the pixels P will be described in detail below. First, a transfer operation of the pixel packets PCT1 and PCT2 will be described below.

Figure 6:
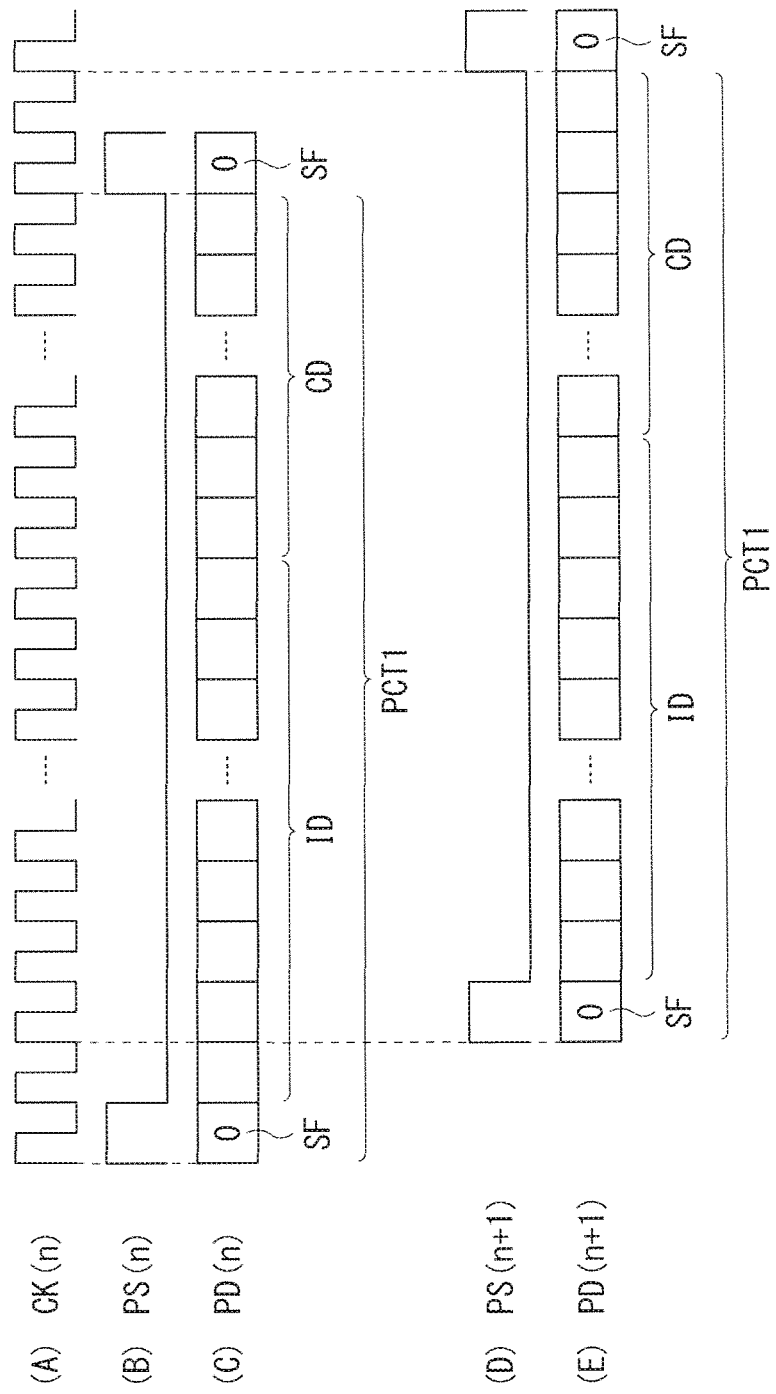
FIG. 6 is a timing chart illustrating an operation example of the pixel illustrated in FIG. 1.

FIG. 6 illustrates an operation in an nth pixel P(n) in a case where the pixel packet PCT1 in which the value of the start flag SF is "0" is supplied to the nth pixel P(n), where parts (A) to (C) indicate a clock signal CK(n) and data signals PS(n) and PD(n) input to the pixel P(n), respectively, and parts (D) and (E) indicate data signals PS(n+1) and PD(n+1) output from the pixel P(n), respectively.

A pixel P(n−1) previous to the pixel P(n) supplies, to the pixel P(n), the data signal PD(n) (the pixel packet PCT1) configured of the start flag SF indicating "0", the luminance data ID, and the control data CD together with the data signal PS(n) and the clock signal CK(n) (refer to the parts (A) to (C) in FIG. 6).

The control section 21 of the pixel P(n) acquires, as the start flag SF, the data signal PD(n) when the data signal PS(n) is turned to "1". In this example, since the start flag SF is "0", the control section 21 outputs the data signals PS(n) and PD(n) as-is as data signals PS(n+1) and PD(n+1) (refer to the parts (D) and (E) in FIG. 6). At this time, in this example, the control section 21 delays the input data signal PS(n) by two clocks to output the delayed data signal PS(n) as the data signal PS(n+1), and delays the input data signal PD(n) by two clocks to output the delayed data signal PD(n) as the data signal PD(n+1). It is to be noted that a delay amount is not limited thereto, and the delay amount may be one clock or three or more clocks.

It is to be noted that, in this example, a case where the pixel packet PCT1 in which the value of the start flag SF is "0" is supplied is described; however, this is applicable to a case where pixel packet PCT2 in which the value of the start flag SF is "0" is supplied.

Figure 7:
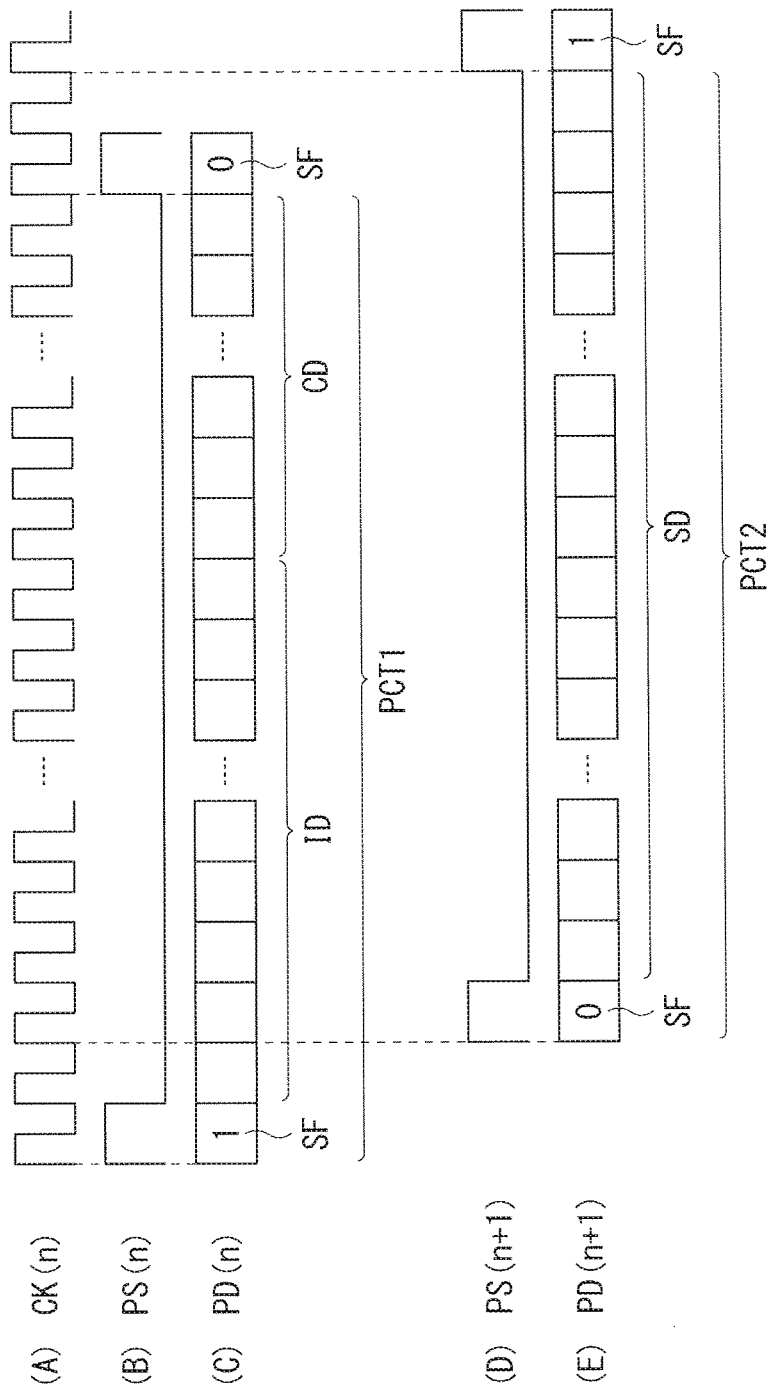
FIG. 7 is a timing chart illustrating another operation example of the pixel illustrated in FIG. 1.

FIG. 7 illustrates an operation in the nth pixel P(n) in a case where the pixel packet PCT1 in which the value of the start flag SF is "1" is supplied to the nth pixel P(n), where parts (A) to (C) indicate the clock signal CK(n) and the data signals PS(n) and PD(n) input to the pixel P(n), respectively, and parts (D) and (E) indicate the data signals PS(n+1) and PD(n+1) output from the pixel P(n), respectively.

The pixel P(n−1) previous to the pixel P(n) supplies, to the pixel P(n), the data signal PD(n) (the pixel packet PCT1) configured of the start flag SF indicating "1", the luminance data ID, and the control data CD together with the data signal PS(n) and the clock signal CK(n) (refer to the parts (A) to (C) in FIG. 7).

The control section 21 of the pixel P(n) acquires, as the start flag SF, the data signal PD(n) when the data signal PS(n) is turned to "1". In this example, since the start flag SF is "1", the control section 21 reads the luminance signal ID and the control data CD, and performs control to allow the pixel P(n) to perform the display operation and the light detection operation, based on the luminance signal ID and the control data CD. Then, the control section 21 changes the value of the start flag SF in the pixel packet PCT1 into "0" and replaces the luminance signal ID and the control data CD with the detection data SD, and further changes the value of the subsequent start flag SF into "1", and delays the changed data signal PD(n) by two clocks in a similar manner to a case in FIG. 6 to output the delayed data signal PD(n) as the data signal PD(n+1) (refer to the part (E) in FIG. 7). In other words, the pixel P(n) generates the pixel packet PCT2 configured of the start flag SF of which the value is "0" and the detection data SD, based on the pixel packet PCT1 in which the value of the start flag SF is "1".

Thus, the pixel P(n) determines, based on the values of the start flags SF of the input pixel packets PCT1 and PCT2, whether or not the pixel packet PCT1 is a subject of processing. Then, in a case where the pixel packet PCT1 is not the subject of processing, the pixel P(n) supplies the pixel packet PCT1 as-is to the subsequent pixel P(n+1). Moreover, in a case where the pixel packet PCT1 is the subject of processing, the pixel P(n) reads the luminance signal ID and the control data DC from the pixel packet PCT1, and generates the pixel packet PCT2 including the detection data SD to supply the generated pixel packet PCT2 to the subsequent pixel P(n+1).

Figure 8:
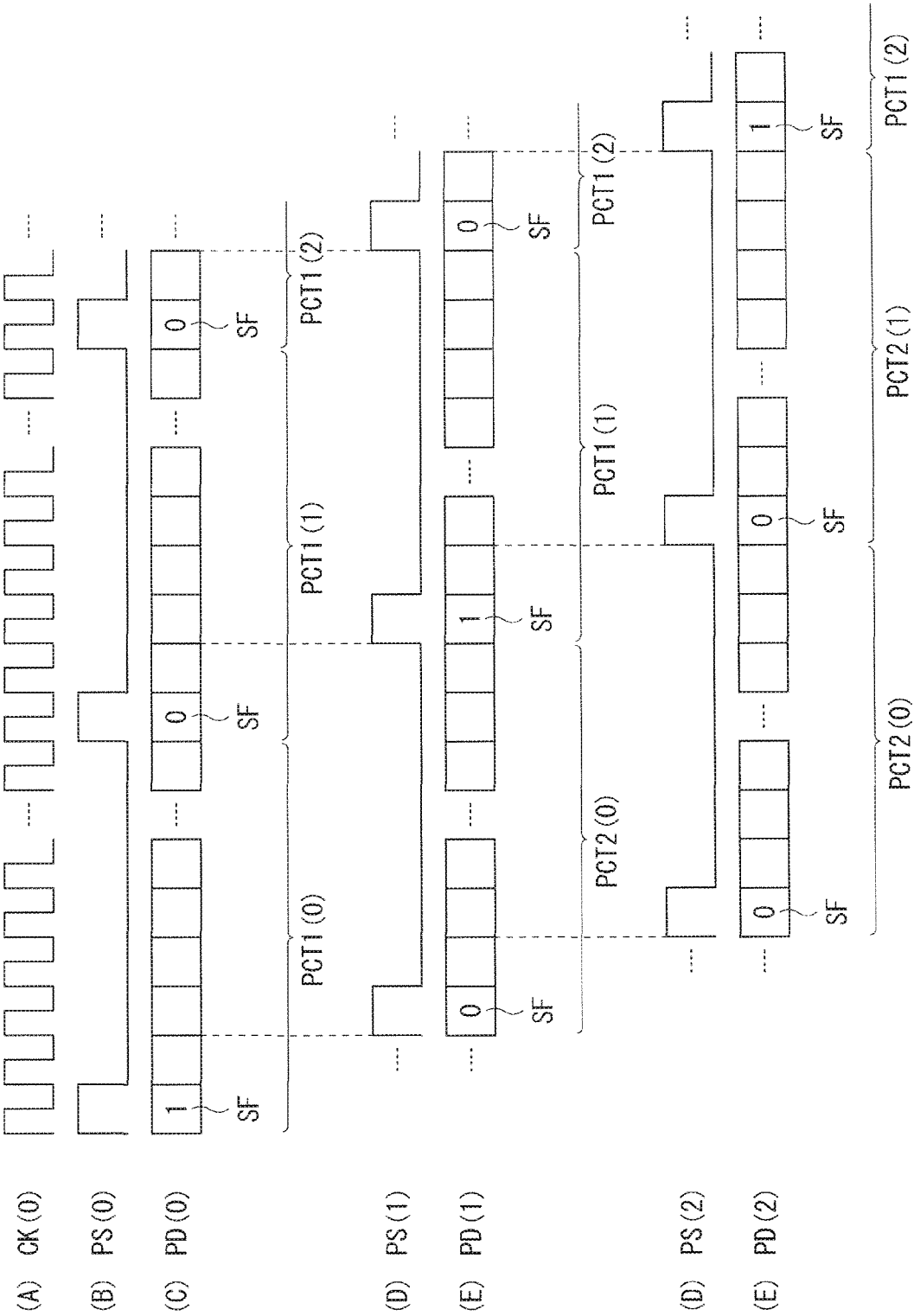
FIG. 8 is a timing chart illustrating an operation example of the display panel illustrated in FIG. 1.

FIG. 8 illustrates a transfer operation of the pixel packets PCT1 and PCT2 in the display section 20, where parts (A) to (C) indicate the clock signal CK(0) and the data signals PS(0) and PD(0) input to the pixel P(0), respectively, parts (D) and (E) indicate data signals PS(1) and PD(1) input to the pixel P(1), respectively, and parts (F) and (G) indicate the data signals PS(2) and PD(2) input to the pixel P(2), respectively.

The driver section 12 generates the data signal PD(0) configured of a series of a pixel packet PCT1(0) for the 0th pixel P(0), a pixel packet PCT1(1) for the first pixel P(1), and a pixel packet PCT1(2) for the second pixel P(2), and supplies, to the pixel P(0) in the first stage, the data signal PD(0) together with the data signal PS(0) and the clock signal CK(0) (refer to the parts (A) to (C) in FIG. 8).

The 0th pixel P(0) detects the start flag SF of which the value is "1" (the start flag SF of the pixel packet PCT1(0)) in the data signal PD(0) (refer to the part (C) in FIG. 8). Then, the pixel P(0) reads the luminance signal ID and the control data CD included in the pixel packet PCT1(0). Then, the pixel P(0) changes the value of the start flag SF of the pixel packet PCT1(0) into "0", and replaces the luminance signal ID and the control data CD with the detection data SD, thereby generating the pixel packet PCT2(0) (refer to the part (E) in FIG. 8).

After that, the pixel P(0) outputs the pixel packet (the pixel packet PCT1(1), PCT1(2), or the like) in which the value of the start flag SF is "0" as-is in the data signal PD(0) (the part (C) in FIG. 8) (refer to the part (E) in FIG. 8). At this time, the pixel P(0) changes the value of the start flag SF (the start flag SF of the pixel packet PCT1(1)) subsequent to the generated pixel packet PCT2(0) in the data signal PD(1) (the part (E) in FIG. 8) into "1".

The first pixel P(1) outputs the pixel packet PCT2(0) in which the value of the start flag SF is "0" in the data signal PD(1) (the part (E) in FIG. 8) as-is (refer to the part (G) in FIG. 8).

After that, the pixel P(1) detects the start flag SF of which the value is "1" (the start flag SF of the pixel packet PCT1(1)) in the data signal PD(1) (the part (E) in FIG. 8). Then, the pixel P(1) reads the luminance signal ID and the control data CD included in the pixel packet PCT1(1). Then, the pixel P(1) changes the value of the start flag SF of the pixel packet PCT1(1) into "0", and replaces the luminance signal ID and the control data CD with the detection data SD, thereby generating the pixel packet PCT2(1) (refer to the part (G) in FIG. 8).

After that, the pixel P(1) outputs the pixel packet in which the value of the start flag SF is "0" (the pixel packet PCT1(2) or the like) as-is in the data signal PD(1) (the part (E) in FIG. 8) (refer to the part (E) in FIG. 8). At this time, the pixel P(1) changes the value of the start flag SF (the start flag SF of the pixel packet PCT1(2)) subsequent to the generated pixel packet PCT2(1) in the data signal PD(1) (the part (G) in FIG. 8) into "1".

Thus, the N-number of pixels P connected in a daisy chain fashion sequentially transfer the pixel packets PCT1 and PCT2. Then, each of the pixels P performs the display operation, based on the luminance signal ID and the control data CD (light emission timing data ETD) acquired from the pixel packet PCT1, and performs the light detection operation, based on the control data CD (detection timing data STD) acquired from the pixel packet PCT1.

(Specific Operation of Pixel P)

Figure 9:
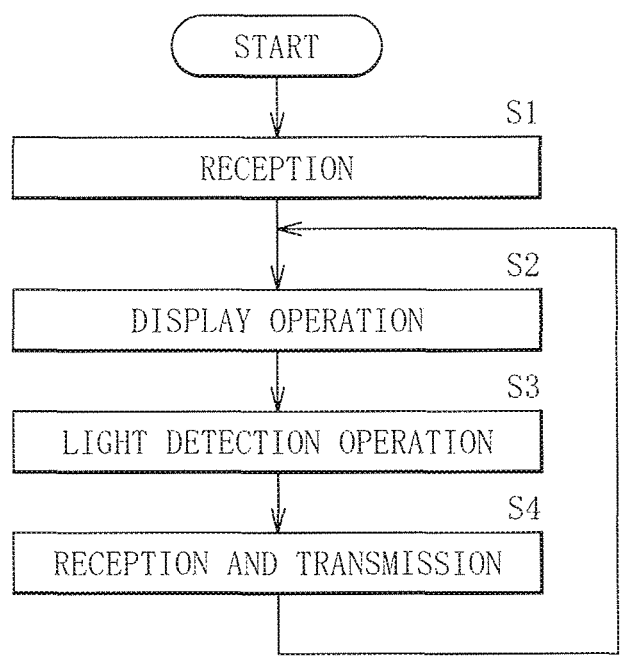
FIG. 9 is a flow chart illustrating an operation example of the display panel illustrated in FIG. 1.
Figure 10:
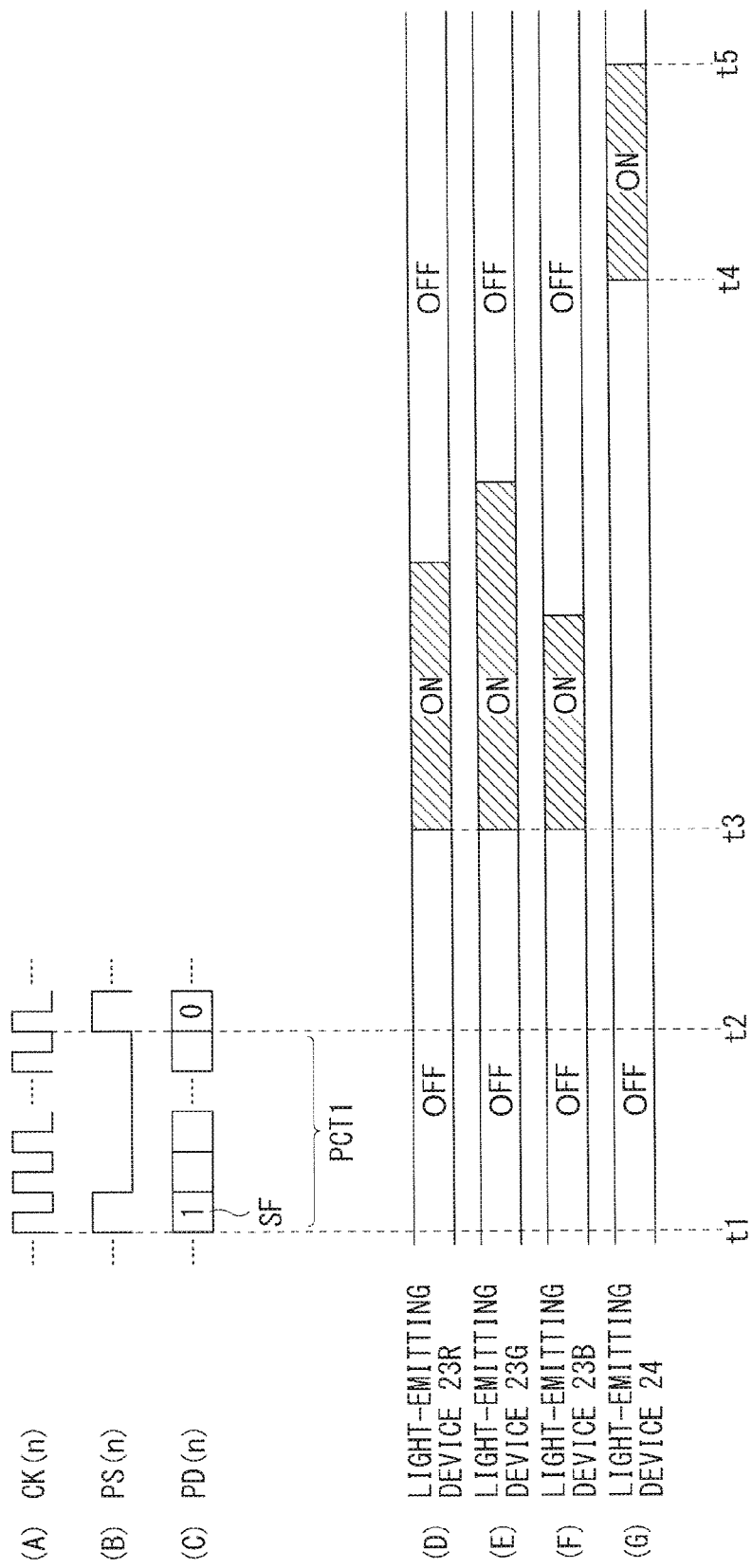
FIG. 10 is a timing chart illustrating another operation example of the display panel illustrated in FIG. 1.

FIG. 9 illustrates a flow chart illustrating an operation example of the pixel P. FIG. 10 illustrates a timing chart illustrating an operation example of the pixel P. In parts (D) to (F) in FIG. 10, "ON" indicates a state in which the light-emitting device 23R, 23G, or 23B emits light, and "OFF" indicates a state in which the light-emitting device 23R, 23G, or 23B does not emit light. Moreover, in a part (G) in FIG. 10, "ON" indicates a state in which the light detection section 24 detects light, and "OFF" indicates a state in which the light detection section 24 does not detect light. The pixel P performs the display operation and the light detection operation in one frame period in a time-divisional manner. Such an operation of the pixel P will be described in detail below.

First, the pixel P receives the pixel packet PCT1 in which the value of the start flag SF is "1" in a period from a timing t1 to a timing t2 (refer to FIG. 10) (step S1). More specifically, when the control section 21 of the pixel P detects that the value of the start flag SF in the pixel packet PCT1 is "1", the control section 21 of the pixel P initializes the reference counter 29, and the count value CNT0 start incrementing from an initial value (for example, "0"). Then, the control section 21 reads the luminance data ID and the control data CD following the start flag SF, and supplies the luminance data ID (the luminance data IDR, IDG, and IDB) to the registers 52R, 52G, and 52B with use of the signal DID and the clock signals CLKR, CLKG, and CLKB. Then, the registers 52R, 52G, and 52B hold the luminance data IDR, IDG, and IDB, respectively. Moreover, the control section 21 supplies the light emission timing data ETD included in the control data CD to the count control section 51 with use of the signal DETD, and supplies the detection timing data STD included in the control data CD to the count control section 51 with use of the signal DSTD.

The reference counter 29 increments the count value CNT0 after initializing the count value CNT0. Then, at a timing t3, the count value CNT0 becomes larger than the value of the light emission timing data ETD.

Next, the pixel P starts the display operation at the timing t3 (refer to FIG. 10) (step S2). More specifically, at the timing t3, the count control section 51 starts incrementing the count value CNT1 from the initial value (for example, "0"). In other words, at the timing t3, the count value CNT0 becomes larger than the value of the light emission timing data ETD; therefore, the count control section 51 starts incrementing the count value CNT1 from the initial value. Then, the count comparison sections 53R, 53G, and 53B generate pulse signals with pulse widths of periods from a timing at which the count value CNT1 starts incrementing from the initial value (for example, "0") to a timing at which the count value CNT1 reaches the values of the luminance data IDR, IDG, and IDB, respectively. Then, the light-emitting devices 23R, 23G, and 23B emit light with predetermined luminances in respective pulse periods. Thus, the light-emitting devices 23R, 23G, and 23B emit light in periods with lengths according to the luminance data IDR, IDG, and IDB from the timing t3 according to the light emission timing data ETD, respectively.

After that, the reference counter 29 continues incrementing the count value CNT0. Then, at a timing t4, the count value CNT0 becomes larger than the value of the detection timing data STD.

Next, the pixel P performs the light detection operation in a period from the timing t4 to a timing t5 (refer to FIG. 10) (step S3). More specifically, first, at the timing t4, the count control section 61 turns the detection control signal CTLS to enabled in a predetermined period from the timing t4 to the timing t5. In other words, at the timing t4, the count value CNT0 is larger than the value of the detection timing data STD; therefore, the count control section 61 turns the detection control signal CTLS to enabled in a predetermined period from the timing t4. Then, in a period in which the detection control signal CTLS is enabled, the I/V conversion section 63 integrates a current signal (I) supplied from the light detection device 62 to convert the current signal (I) into a voltage signal (V). Immediately before the timing t5, the A/D conversion section 64 samples the voltage signal (an analog signal) from the I/V conversion section 63, and converts the analog signal into a digital signal to output the digital signal as the detection data SD. Then, the register 65 holds the detection data SD. Thus, the light detection section 24 detects light in the predetermined period from the timing t4 according to the detection timing data STD.

Next, the pixel P receives the pixel packet PCT1 in which the value of the start flag SF is "1", and transmits the pixel packet PCT2 (step S4). More specifically, as with the step S1, the pixel P reads the luminance data ID and the control data CD from the pixel packet PCT1 in which the value of the start flag SF is "1", and performs predetermined processing. Then, the control section 21 acquires the detection data SD from the register 65 with use of the signal DSD and the clock signal CLKS. Then, the control section 21 changes the value of the start flag SF in the pixel packet PCT1 into "0", and replaces the luminance signal ID and the control data CD with the detection data SD, thereby generating and transmitting the pixel packet PCT2.

The pixel P repeats the operations in the steps S2 to S4 from then on.

Thus, in the display panel 1, the light emission data ETD and the detection timing data STD are allowed to be set for each pixel P. Therefore, in the display panel 1, light emission start timings (the timing t3 in FIG. 10) for the light-emitting devices 23R, 23G, and 23B are allowed to be set for each pixel P, and a detection start timing (the timing t4 in FIG. 10) for the light detection section 24 is allowed to be set for each pixel P.

Figure 11:
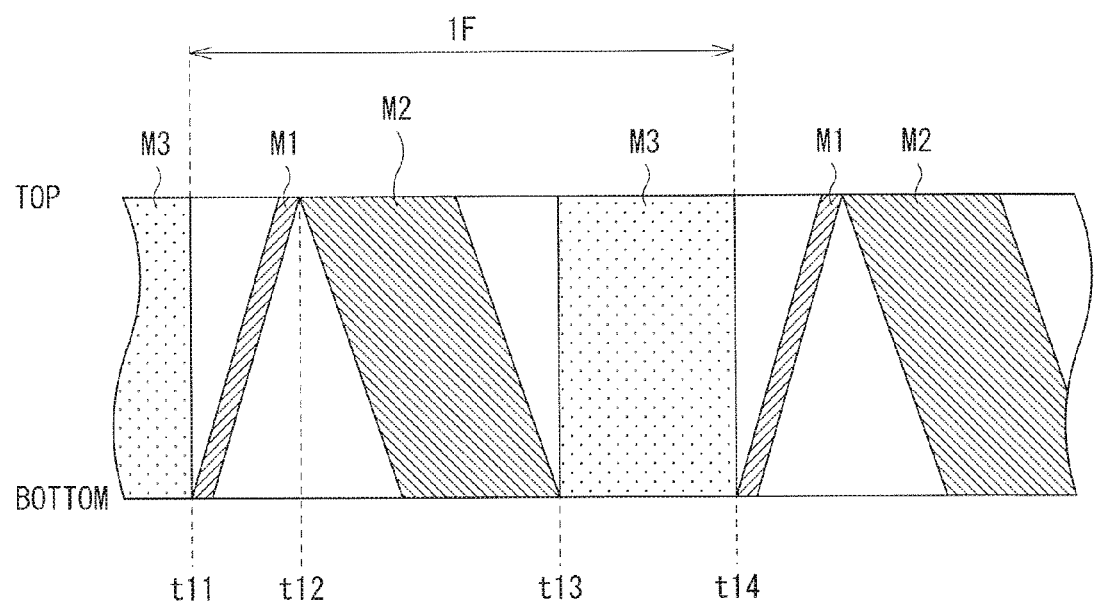
FIG. 11 is a timing chart illustrating still another operation example of the display panel illustrated in FIG. 1.

FIG. 11 illustrates a timing chart of the display operation and the light detection operation in the display panel 1. In FIG. 11, a horizontal axis indicates time, and a vertical axis indicates a position in a vertical direction (a longitudinal direction) in the display section 20. In the display panel 1, a transfer operation M1, a display operation M2, and a light detection operation M3 are performed in each frame period (1 F). These operations will be described in detail below.

First, in a period from a timing t11 to a timing t12, the display panel 1 performs the transfer operation M1. More specifically, first, the driver section 12 supplies a series of the pixel packets PCT1 with use of the data signals PS and PD and the clock signal CK to respective pixel columns of the pixels of the display section 20. Then, each of the pixels P generates the pixel packet PCT2, based on the pixel packet PCT1 in which the start flag SF is "1" of the series of the pixel packets PCT1 to supply the generated pixel packet PCT2 to the pixel P subsequent thereto, and supplies, to the pixel P subsequent thereto, the pixel packets PCT1 and PCT2 in which the start flag SF is "0" as-is. Accordingly, the N-number of pixels P connected in a daisy chain fashion sequentially transfer the pixel packets PCT1 and PCT2. At this time, in this example, as illustrated in FIG. 1, since the driver section 12 is arranged below the display section 20, as illustrated in FIG. 11, the display section 20 sequentially transfers the pixel packets PCT1 and PCT2 from a bottom to a top in the display section 20.

Next, in a period from the timing t12 to a timing t13, the display panel 1 performs the display operation M2. More specifically, the light-emitting devices 23R, 23G, and 23B of each pixel P emit light in periods with lengths corresponding to the luminance data IDR, IDG, and IDB from a timing according to the light emission timing data ETD, respectively. In this example, the light emission timing data ETD is set to allow the display panel 1 to sequentially start the display operation M2 from the top to the bottom in the display section 20. In other words, the display panel 1 sequentially starts the display operation M2 from the top as with a typical display panel configured to perform a display operation from an top of a display screen by line-sequential scanning. It is to be noted that, in this example, the luminance data IDR, IDG, and IDB are set to respective maximum values. In other words, light emission periods (widths in a horizontal direction of the display operation M2 in FIG. 11) of the light-emitting devices 23R, 23G, and 23B are set to be longest. The longest light emission time is about ⅓ of one frame period. Therefore, in the display panel 1, for example, a possibility that the user perceives deterioration in image quality caused by generation of afterimages when a user watches quick motion scenes is allowed to be reduced.

Next, in a period from the timing t13 to a timing t14, the display panel 1 performs the light detection operation M3. More specifically, the light detection section 24 of each pixel P detects light in a predetermined period from a timing according to the detection timing data STD. In this example, the detection timing data STD is so set as to allow the display panel 1 to perform the light detection operation M3 on the entire display section 20 in a same period. Therefore, in the display panel 1, light is allowed to be detected accurately. In other words, for example, in a case where the light detection operation sequentially starts from the top of the display screen as with the display operation M2, map data of light detection results may be distorted due to a difference in the light detection period between respective lines to cause a decline in light detection accuracy. On the other hand, in the display panel 1, the light detection operation M3 is performed on the entire display section 20 in the same period; therefore, a possibility that map data of the light detection results is distorted is allowed to be reduced, and a possibility of a decline in light detection accuracy is allowed to be reduced.

Thus, in the display panel 1, the light emission data ETD and the detection timing data STD are set for each pixel P; therefore, the start timings of the display operation M2 and the light detection operation M3 are allowed to be freely set, and flexibility of operation is allowed to be enhanced.

Moreover, in the display panel 1, the light detection operation M3 is performed in a period in which the light-emitting devices 23R, 23G, and 23B do not perform the light emission operation; therefore, the light detection operation is allowed to be performed with effective use of time. In other words, in the display panel 1, as illustrated in FIG. 11, to enhance image quality, the longest light emission time of each of the light-emitting devices 23R, 23G, and 23B is set to about ⅓ of one frame period. Therefore, for example, in a case where the display panel 1 does not perform the light detection operation M3, a period in which each pixel P does not perform a practical operation, i.e., each pixel P is in an idle state is generated. In the display panel 1, the light detection operation M3 is performed in this period; therefore, time is allowed to be effectively used.

Moreover, in the display panel 1, each pixel P receives the pixel packet PCT1 in which the value of the start flag SF is "1" and generates and transmits the pixel packet PCT2; therefore, the light detection operation is allowed to be performed with effective use of a transmission band. In other words, the luminance data ID and the control data CD included in a certain pixel packet PCT1 are read only by one pixel P, and one or more pixels P connected subsequent to the one pixel P do not substantially use the certain pixel packet PCT1. Therefore, for example, in a case where the display panel 1 does not perform the light detection operation M3, the transmission band may be useless. On the other hand, in the display panel 1, the pixel packet PCT1 in which the value of the start flag SF is "1" is received, and the pixel packet PCT2 is generated and transmitted: therefore, the transmission band is allowed to be effectively used.

In the display panel 1, the pixels P are connected in a daisy chain fashion. Therefore, each pixel P receives the data signals PS and PD and the clock signal CK from the pixel P previous thereto, and generates new data signals PS and PD and a new clock signal CK, based on the received signals to supply the new data signals PS and PD and the new clock signal CK to the pixel P subsequent thereto. Then, each pixel P reads the luminance data IC corresponding to the pixel P from the data signal PD, and emits light with a luminance according to the luminance data ID. Thus, in the display panel 1, the pixels P are connected in a daisy chain fashion; therefore, image quality is allowed to be enhanced.

In other words, for example, in a display unit described in Japanese Unexamined Patent Application Publication No. 2012-32828, a drive section drives each pixel through a gate line or a data line. The gate line or the data line is so-called global wiring connected to a plurality of pixels belonging to one pixel column or a plurality of pixels belonging to one pixel row. Therefore, for example, to achieve a large-screen display panel, lengths of these wiring lines are increased; therefore, resistance or parasitic capacity of the wiring lines may be increased, and each pixel may not be allowed to be sufficiently driven accordingly. Moreover, for example, to achieve a high-definition display panel, it is necessary to drive a larger number of lines in each frame period; therefore, time assigned to one horizontal period (1 H) may be reduced, and each pixel may not be allowed to be sufficiently driven accordingly. Further, for example, to increase a frame rate, time assigned to one horizontal period (1 H) may be reduced, and each pixel may not be allowed to be sufficiently driven accordingly.

On the other hand, in the display panel 1 according to this embodiment, the pixels are connected in a daisy chain fashion. In other words, each pixel P drives the pixel P subsequent thereto not through the above-described global wiring but through local wiring between the pixels. Therefore, each pixel P is allowed to drive the pixel P subsequent thereto relatively easily through such short wiring, and a large-screen display panel is allowed to be achieved. Moreover, since the wiring is short, each pixel P is allowed to increase transfer speed of the data signals PS, PD, and the like relatively easily, and a high-definition display panel or a display panel with a high frame rate is allowed to be achieved.

Moreover, since the pixels P are connected in a daisy chain fashion in such a manner, the configuration of the display panel 1 is allowed to be simplified. In other words, in the display panel described in Japanese Unexamined Patent Application Publication No. 2012-32828, a plurality of gate lines extending along a horizontal direction, a plurality of data lines extending along a vertical direction, a so-called gate driver connected to the gate lines, and a so-called data driver connected to the data lines are provided; therefore, the configuration of the display panel may be complicated. On the other hand, in the display panel 1 according to this embodiment, the pixels P are connected in a daisy chain fashion; therefore, as illustrated in FIG. 1, it is only necessary to provide wiring between the pixels P extending along the vertical direction, the driver section 20, and the like. Therefore, it is not necessary to provide wiring extending along the horizontal direction and a drive section for driving of the wiring, and the configuration of the display panel 1 is allowed to be simplified.

Moreover, in the display panel 1, light emission of each pixel P is controlled with use of a digital signal (the data signals PS and PD and the clock signal CK); therefore, an influence of noise on image quality is allowed to be reduced. For example, in the display panel in Japanese Unexamined Patent Application Publication No. 2012-32828, an analog signal is used; therefore, noise may cause deterioration in image quality. Moreover, specifically in the large-screen display panel, the high-definition display panel, and the display panel with a high frame rate, the influence of noise on image quality may be further increased. On the other hand, in the display panel 1 according to this embodiment, the digital signal is used; therefore, the influence of noise on image quality is allowed to be reduced.

Further, since the digital signals are used in such a manner, radiation is allowed to be reduced. In other words, for example, in a case where an analog signal is used, in terms of gradation expression, resistance to noise, and the like, it is necessary to increase signal amplitude, and in this case, radiation may be increased. On the other hand, in the display panel 1 according to this embodiment, the digital signal is used; therefore, the signal amplitude is allowed to be reduced, thereby reducing radiation.

Furthermore, in the display panel 1, the pixels P are connected in a daisy chain fashion; therefore, signal amplitudes of the data signals PS and PD and the like are allowed to be reduced. In other words, for example, in a case of the above-described global wiring, the signal amplitude may be attenuated with an increasing distance from the display drive section. In this case, it is necessary for the display drive section to generate the data signals PS and PD with a large signal amplitude. On the other hand, in the display panel 1, the signal amplitude is maintained by performing waveform shaping on the data signals PS and PD and the clock signal CK every time these signals pass through the pixel P. In other words, a possibility that the signal amplitude is attenuated is allowed to be reduced; therefore, the signal amplitudes of the data signals PS and PD are allowed to be reduced. Therefore, while the above-described radiation is allowed to be reduced, a power supply voltage is allowed to be reduced, and power consumption is allowed to be reduced.

[Effects]

As described above, in this embodiment, the light detection operation is performed in a period in which the light-emitting devices do not perform a light emission operation; therefore, the light detection operation is allowed to be performed with effective use of time.

Moreover, in this embodiment, each pixel receives the pixel packet PCT1 and generates and transmits the pixel packet PCT2; therefore, the light detection operation is allowed to be performed with effective use of the transmission band.

Further, in this embodiment, the light emission timing data and the detection timing data are set for each pixel; therefore, start timings of the display operation and the light detection operation are allowed to be freely set.

Modification Example 1-1

Figure 12:
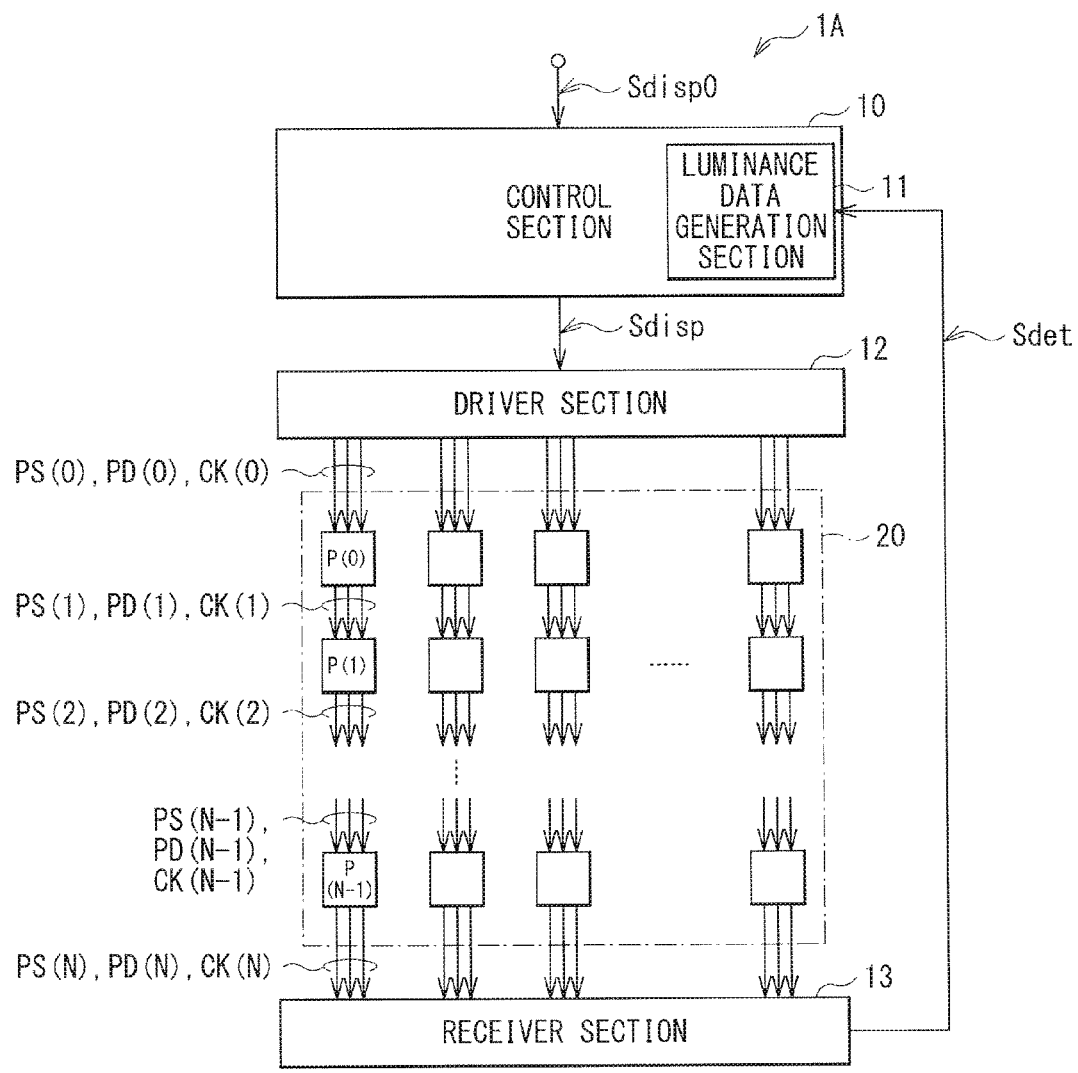
FIG. 12 is a block diagram illustrating a configuration example of a display panel according to a modification example of the first embodiment.
Figure 13:
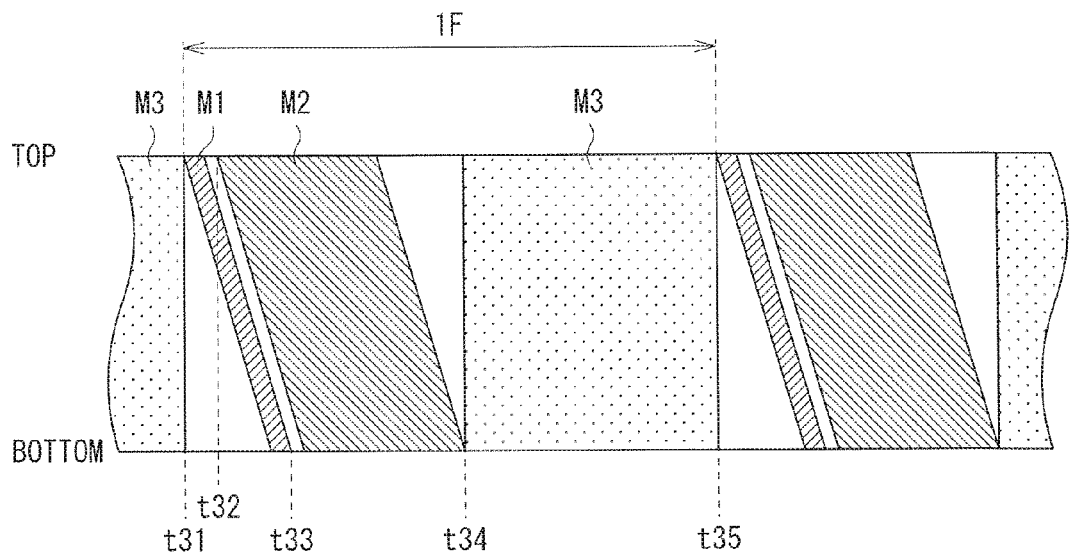
FIG. 13 is a timing chart illustrating an operation example of the display panel illustrated in FIG. 12.

In the above-described embodiment, the driver section 12 is disposed below the display section 20; however, this embodiment is not limited thereto. Alternatively, for example, as with a display panel 1A illustrated in FIG. 12, the driver section 12 may be disposed above the display section 20. In this case, as illustrated in FIG. 13, the display panel 1A sequentially transmits the pixel packets PCT1 and PCT2 from the top to the bottom of the display section 20, and sequentially starts the display operation M2 from the top to the bottom. More specifically, the display section 20 performs the transfer operation M1 in a period from a timing t31 to a timing t33, and performs the display operation M2 in a period from a timing t32 before the timing t33 to a timing t34. Thus, in the display panel 1A, compared to the display panel 1, for example, a period in which the light detection operation M3 is performed (from the timing t34 to a timing t35) may be set to be long.

Modification Example 1-2

A large display unit may be configured by arranging a plurality of the display panels 1 according to the above-described embodiment. This modification example will be described below with some examples.

Figure 14:
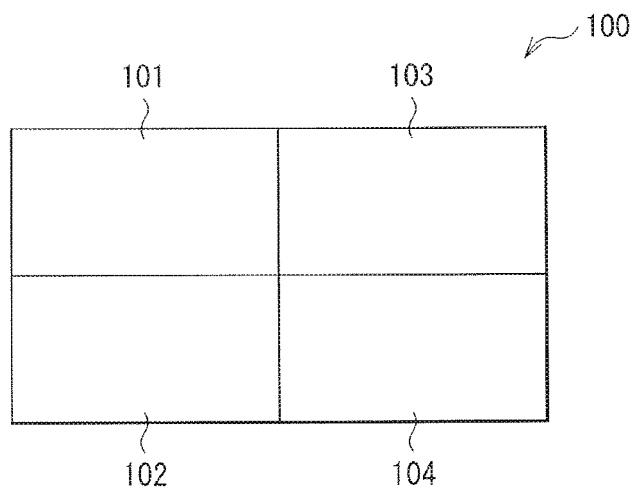
FIG. 14 is an explanatory diagram illustrating a configuration example of a display unit including a plurality of display panels according to a modification example of the first embodiment.

FIG. 14 illustrates a configuration example of a display unit 100 according to this modification example. In the display unit 100, four display panels 1 (101 to 104) are arranged in an array of two horizontal rows by two vertical columns. More specifically, the display panels 101, 102, 103, and 104 are arranged at the upper left, the lower left, the upper right, and the lower right, respectively.

Figure 15:
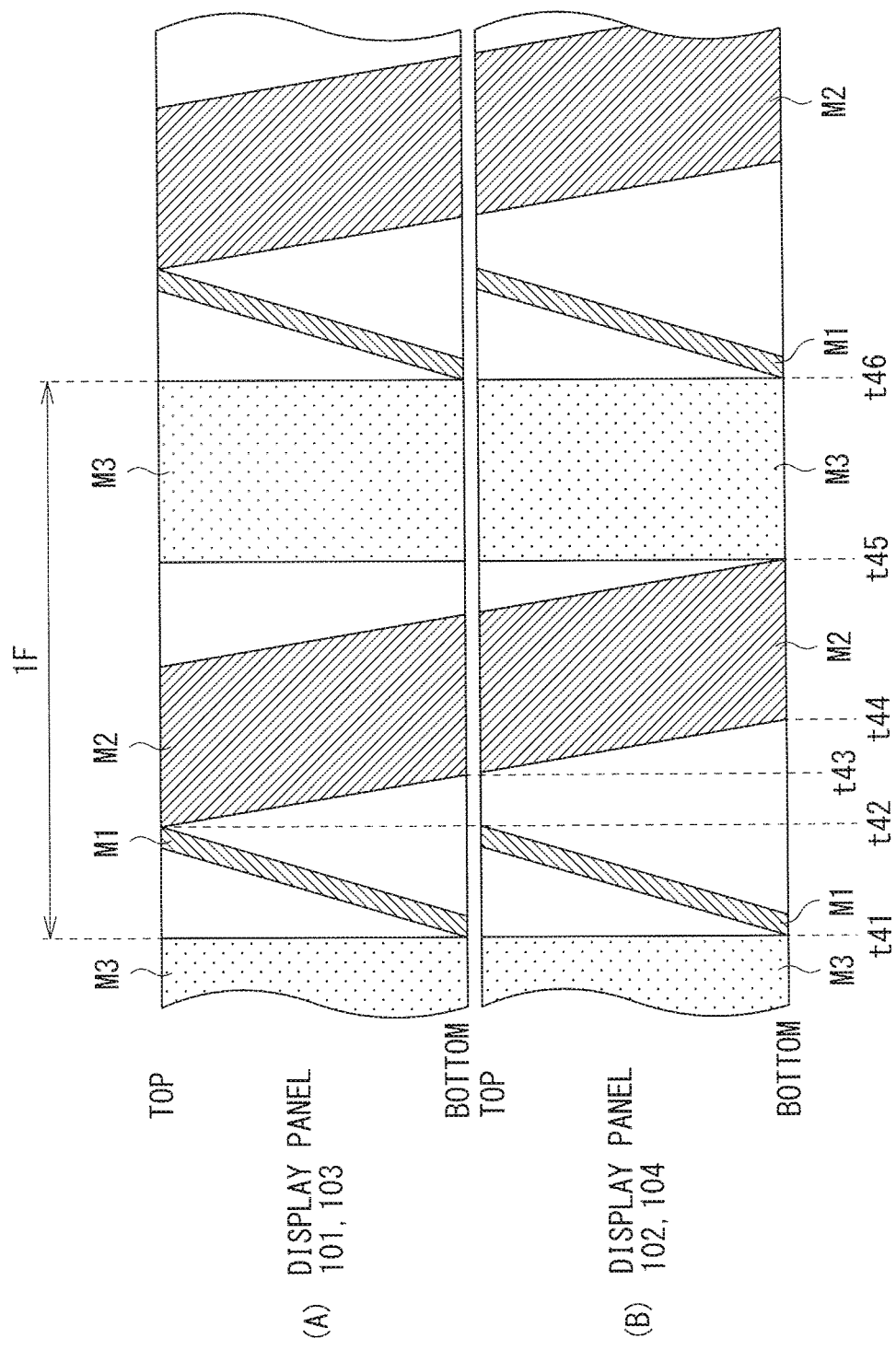
FIG. 15 is a timing chart illustrating an operation example of the display unit illustrated in FIG. 14.

FIG. 15 illustrates a timing chart of the display operation and the light detection operation in the respective display panels 1 of the display unit 100, where a part (A) indicates operations of the display panels 101 and 103 and a part (B) indicates operations of the display panels 102 and 104. In the display unit 100, four display panels 101 to 104 concurrently perform the transfer operation M1 in a period from a timing t41 to a timing t42. Then, the display panels 101 and 103 arranged in an upper half of the display unit 100 start the display operation M2 from a top to a bottom in a period from the timing t42 to a timing t43, and the display panels 102 and 104 arranged in a lower half of the display unit 100 start the display operation M2 from a top to a bottom in a subsequent period from the timing t43 to a timing t44. In other words, in the display unit 100, the four display panels 101 to 104 perform the display operation M2 from a top to a bottom of a display screen of the display unit 100, as if the four display panels 101 to 104 were one display panel. Then, the four display panels 101 to 104 concurrently perform the light detection operation M3 in a period from a timing t45 to a timing t46. Thus, in the display unit 100, the four display panels 101 to 104 perform the display operation M2, as if the four display panels 101 to 104 were one display panel; therefore, deterioration in image quality is allowed to be reduced.

Moreover, for example, a larger number of display panels 1 may be arranged to configure a larger display unit. A display unit 110 configured by arranging the display panels 1 in an array of ten horizontal row by ten vertical columns will be described below as an example.

Figure 16:
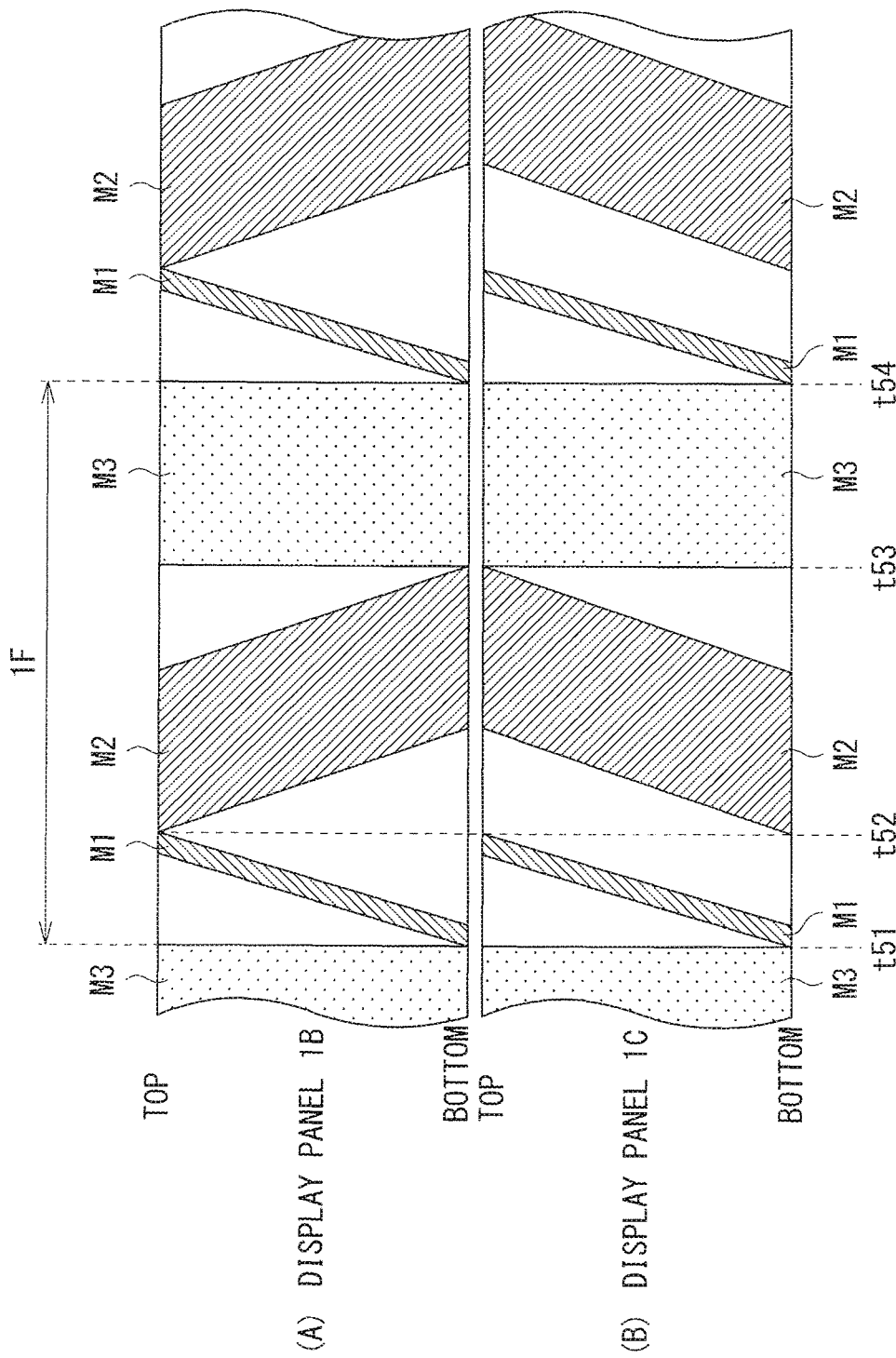
FIG. 16 is a timing chart illustrating an operation example of another display unit including a plurality of display panels according to the modification example of the first embodiment.

FIG. 16 illustrates a timing chart of the display operation and the light detection operation in the respective display panels 1 of the display unit 110, where a part (A) indicates operations of odd-numberth display panels 1B from the top and a part (B) indicates operations of even-numberth display panels 1C from the top. In the display unit 110, all of the display panels 1 concurrently perform the transfer operation M1 in a period from a timing t51 to a timing t52. Then, all of the display panels 1 perform the display operation M2 in a period from the timing t52 to a timing t53. At this time, the odd-numberth display panels 1B sequentially start the display operation M2 from a top to a bottom, and the even-numberth display panels 1C sequentially start display operation M2 from a bottom to a top. In other words, the display operation almost concurrently starts at the bottoms of the odd-numberth display panels 1B and the tops of the even-numberth display panels 1C. Likewise, the display operation M2 almost concurrently starts at the bottoms of the even-numbered display panel 1C and the tops of the odd-numbered display panels 1B arranged below the display panel 1C. Then, all of the display panels 1 perform the light detection operation M3 concurrently in a period from the timing t53 to a timing t54. Thus, in the display unit 110, the display operation M2 starts almost concurrently around a boundary between the display panels 1 adjacent to each other in a vertical direction; therefore, deterioration in image quality is allowed to be reduced.

Modification Example 1-3

In the above-described embodiment, each pixel P expresses luminance gradation by the lengths of light emission time of the light-emitting devices 23R, 23G, and 23B; however, this embodiment is not limited thereto. Alternatively, for example, luminance gradation may be expressed by intensity of light emitted from the light-emitting devices 23R, 23G, and 23B.

Modification Example 1-4

In the above-described embodiment, all of the N-number of pixels P connected in a daisy chain fashion perform the light detection operation; however, this embodiment is not limited thereto. Alternatively, for example, some of the N-number of pixels P may perform the light detection operation. Moreover, in the above-described embodiment, the N-number of pixels P each including the light detection section 24 are connected in a daisy chain fashion; however, a plurality of pixels not including the light detection section 24 and a plurality of pixels P including the light detection section 24 may be connected in a daisy chain fashion. More specifically, for example, pixels not including the light detection section 24 and the pixels P including the light detection section 24 may be alternately arranged.

Modification Example 1-5

In the above-described embodiment, the light detection operation M3 is performed on the entire display section 20 in a same period; however, this embodiment is not limited thereto. Alternatively, for example, as with the display operation M2, the light detection operation M3 may be sequentially performed from the top of the display screen.

2. Second Embodiment

Next, a display panel 2 according to a second embodiment will be described below. In this embodiment, a display section that is configured to display an image and function as a so-called image scanner is used. It is to be noted that like components are denoted by like numerals as of the display panel 1 according to the above-described first embodiment and will not be further described.

Figure 17:
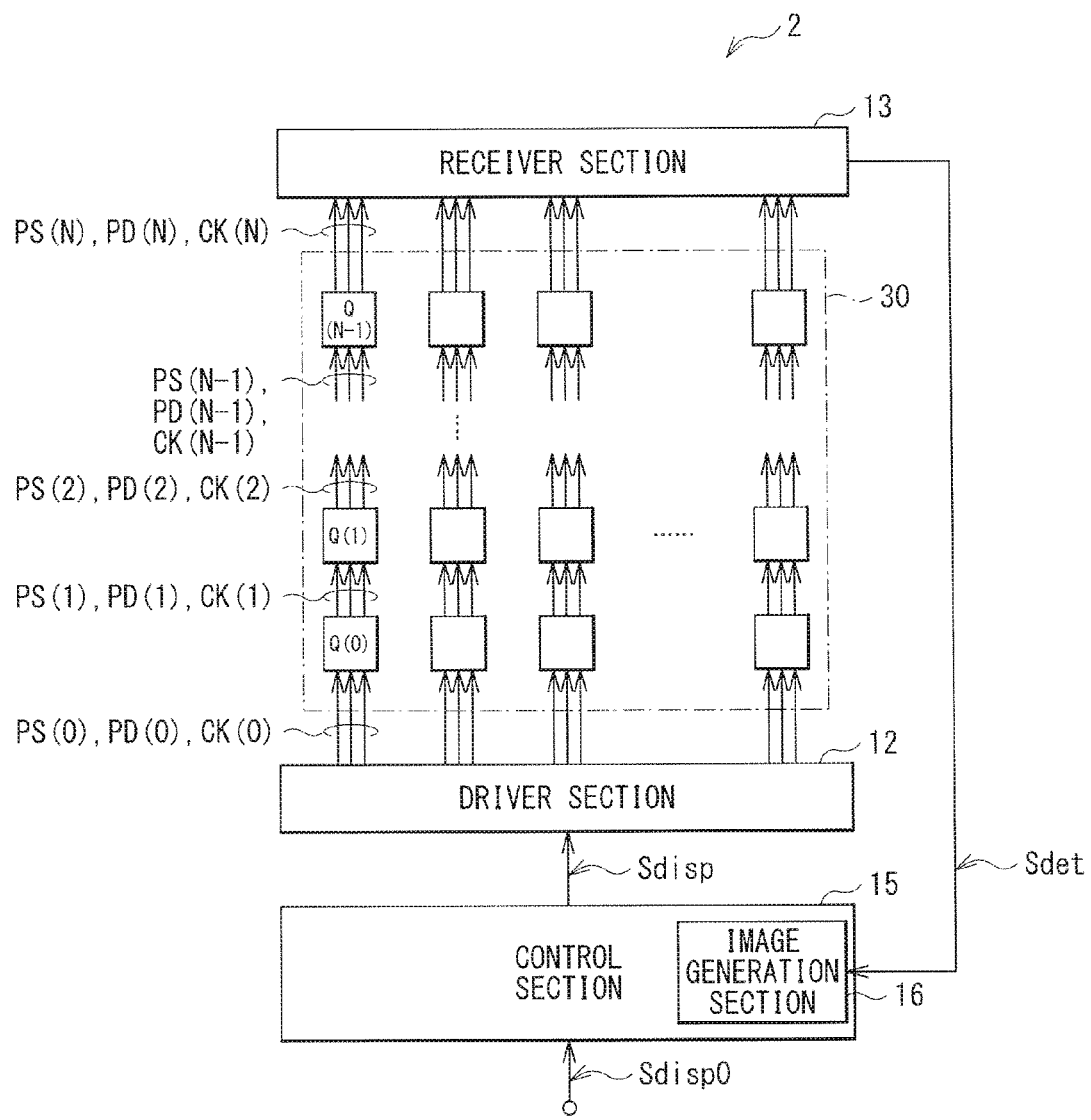
FIG. 17 is a block diagram illustrating a configuration example of a display panel according to a second embodiment.

FIG. 17 illustrates a configuration example of the display panel 2 according to this embodiment. The display panel 2 includes a control section 15 and a display section 30.

The control section 15 includes an image generation section 16. As will be described later, the image generation section 16 is configured to generate an image, based on the detection signal Sdet supplied from the receiver section 13 and replace an image supplied by the image signal Sdisp0 with the generated image.

As with the display section 20, the display section 30 is configured to display an image, based on the data signals PS and PD and the clock signal CK and detect light. In the display section 30, pixels Q are arranged in a matrix form. N-number of pixels Q (Q(0) to Q(N−1)) arranged side by side in a vertical direction are connected in a daisy chain fashion. As illustrated in FIG. 2, each of the pixels Q includes three sub-pixels PsubR, PsubG, and PsubB, and the light sensor SPD.

Figure 18:
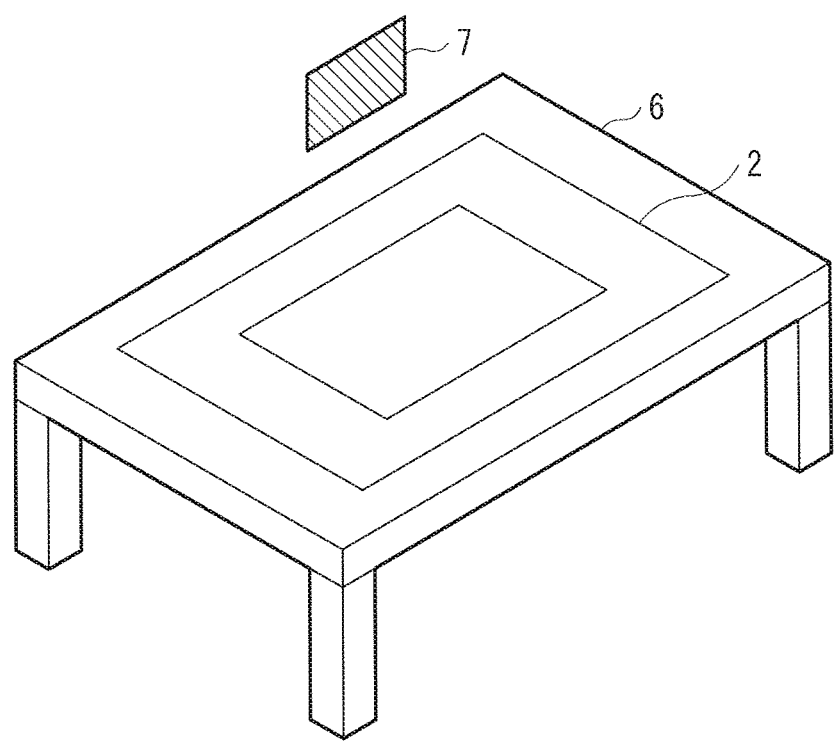
FIG. 18 is an explanatory diagram illustrating an operation example of the display panel illustrated in FIG. 17.

FIG. 18 illustrates an operation example of the display panel 2. In this example, a display unit 6 functioning as a so-called scannable table is configured with use of the display panel 2. The display unit 6 is configured to acquire an image of a photograph 7 placed on a display screen and display the acquired image. More specifically, each of the pixels Q of the display section 30 applies white light to the photograph 7 and detects light, and then supplies a detection result to the receiver section 13. Then, the receiver section 13 supplies the detection results of all of the pixels Q as the detection signal Sdet to the control section 15. The image generation section 16 of the control section 15 generates an image, based on the detection signal Sdet. At this time, the image generation section 16 may perform, for example, predetermined image processing such as magnification of an image and color adjustment. Then, the image generation section 16 replaces the luminance data ID in a predetermined image region of the luminance data ID of one frame image supplied by the image signal Sdisp0 with luminance data ID corresponding to the generated image. Thus, the display panel 2 is allowed to display the image of the photograph 7 on a display surface thereof.

Figure 19:
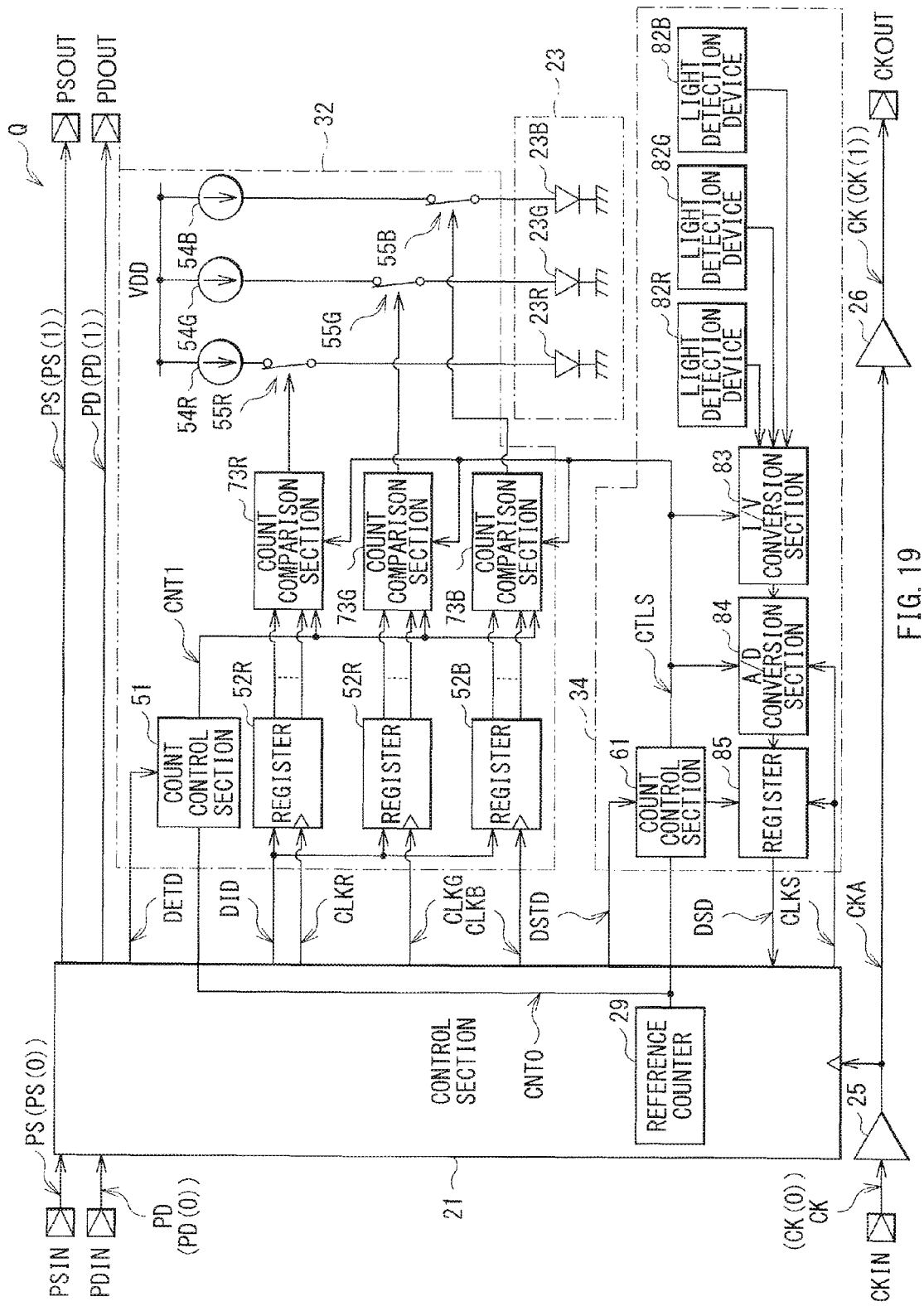
FIG. 19 is a block diagram illustrating a configuration example of a pixel illustrated in FIG. 17.

FIG. 19 illustrates a configuration example of the pixel Q. The pixel Q includes a light emission control section 32 and a light detection section 34.

The light emission control section 32 includes count comparison sections 73R, 73G, and 73B. As with the count comparison section 53R according to the above-described first embodiment, the count comparison section 73R is configured to generate a pulse signal with a pulse width according to the luminance data IDR by comparing the count value CNT1 with the value of the luminance data IDR stored in the register 52R. Moreover, the count comparison section 73R is configured to generate a pulse also in a period in which the detection control signal CTLS is enabled. This is also applicable to the count comparison sections 73G and 73B. Thus, the light emission control section 32 allows the light emission section 23 to emit white light in a predetermined period from a timing according to the detection timing data STD.

The light detection section 34 includes light detection devices 82R, 82G, and 82B, an I/V conversion section 83, an A/D conversion section 84, and a register 85. The light detection device 82R is configured to output a current according to intensity of red (R) light, the light detection device 82G is configured to output a current according to intensity of green (G) light, and light detection device 82B is configured to output a current according to intensity of blue (B) light. The three light detection devices 82R, 82G, and 82B correspond to the light sensor SPD illustrated in FIG. 2. The light detection devices 82R, 82G, and 82B may be configured with use of red (R), green (G), and blue (B) color filters and photodiodes, respectively. The I/V conversion section 83 is configured to integrate a current signal (I) supplied from each of the light detection devices 82R, 82G, and 82B, based on the detection control signal CTLS to convert the current signal (I) into a voltage signal (V). At this time, the I/V conversion section 83 switches the current signals supplied from the light detection devices 82R, 82G, and 82B from one to another in a time-divisional manner, and integrates the respective current signals to convert the respective current signals into respective voltage signals. Then, the A/D conversion section 64 converts the respective voltage signals (analog signals) into respective digital signals, and then outputs the digital signals as the detection data SD. In other words, the detection data SD includes detection results of the three light detection devices 82R, 82G, and 82B. The register 85 is configured to hold the detection data SD supplied from the A/D conversion section 84. Then, the register 85 is configured to supply the held detection data SD to the control section 21 with use of the signal DSD, based on the clock signal CLKS.

It is to be noted that, in this example, the I/V conversion section 83 integrates the current signals supplied from the light detection devices 82R, 82G, and 82B from one to another in a time-divisional manner; however, this embodiment is not limited thereto. Alternatively, for example, the current signals supplied from the light detection devices 82R, 82G, and 82B may be integrated concurrently by providing a three-system IN conversion section.

The pixel Q corresponds to a specific example of "unit pixel" in an embodiment of the present disclosure. The image generation section 16 corresponds to a specific example of "luminance data generation section" in an embodiment of the present disclosure.

Figure 20:
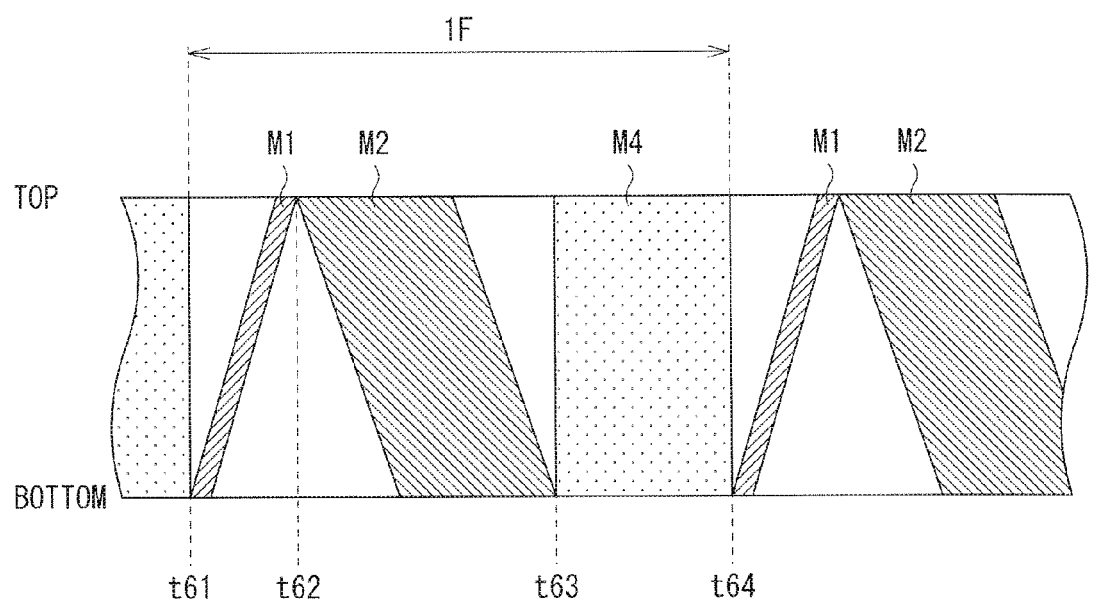
FIG. 20 is a timing chart illustrating an operation example of the display panel illustrated in FIG. 17.

FIG. 20 illustrates a timing chart of a display operation and an image acquisition operation in the display panel 2. In the display panel 2, for example, in one frame period (1 F), the transfer operation M1, the display operation M2, and an image acquisition operation M4 are performed. More specifically, as with the display panel 1 according to the above-described first embodiment (refer to FIG. 11), the display panel 2 first performs the transfer operation M1 in a period from a timing t61 to a timing t62, and performs the display operation M2 in a period from the timing t62 to a timing t63. Next, the display panel 2 performs the image acquisition operation M4 in a period from the timing t63 to a timing t64. More specifically, the light emission section 23 of each pixel Q emits white light in a predetermined period from a timing according to the detection timing data STD. Then, the light detection section 34 of each pixel Q detects red (R) light, green (G) light, and bleu (B) light in a predetermined period from a timing according to the detection timing data STD in a time-divisional manner.

Thus, in this embodiment, the light emission operation is performed concurrently with the light detection operation; therefore, an image is allowed to be acquired. Other effects are similar to those in the above-described first embodiment.

Modification Example 2-1

The respective modification examples of the above-described first embodiment may be applied to the display panel 2 according to the above-described embodiment.

3. Third Embodiment

Next, a display panel 3 according to a third embodiment will be described below. The display panel 3 according to this embodiment has a function of correcting a change in luminance in the display section with time. It is to be noted that like components are denoted by like numerals as of the display panel 1 according to the above-described first embodiment and the like and will not be further described.

Figure 21:
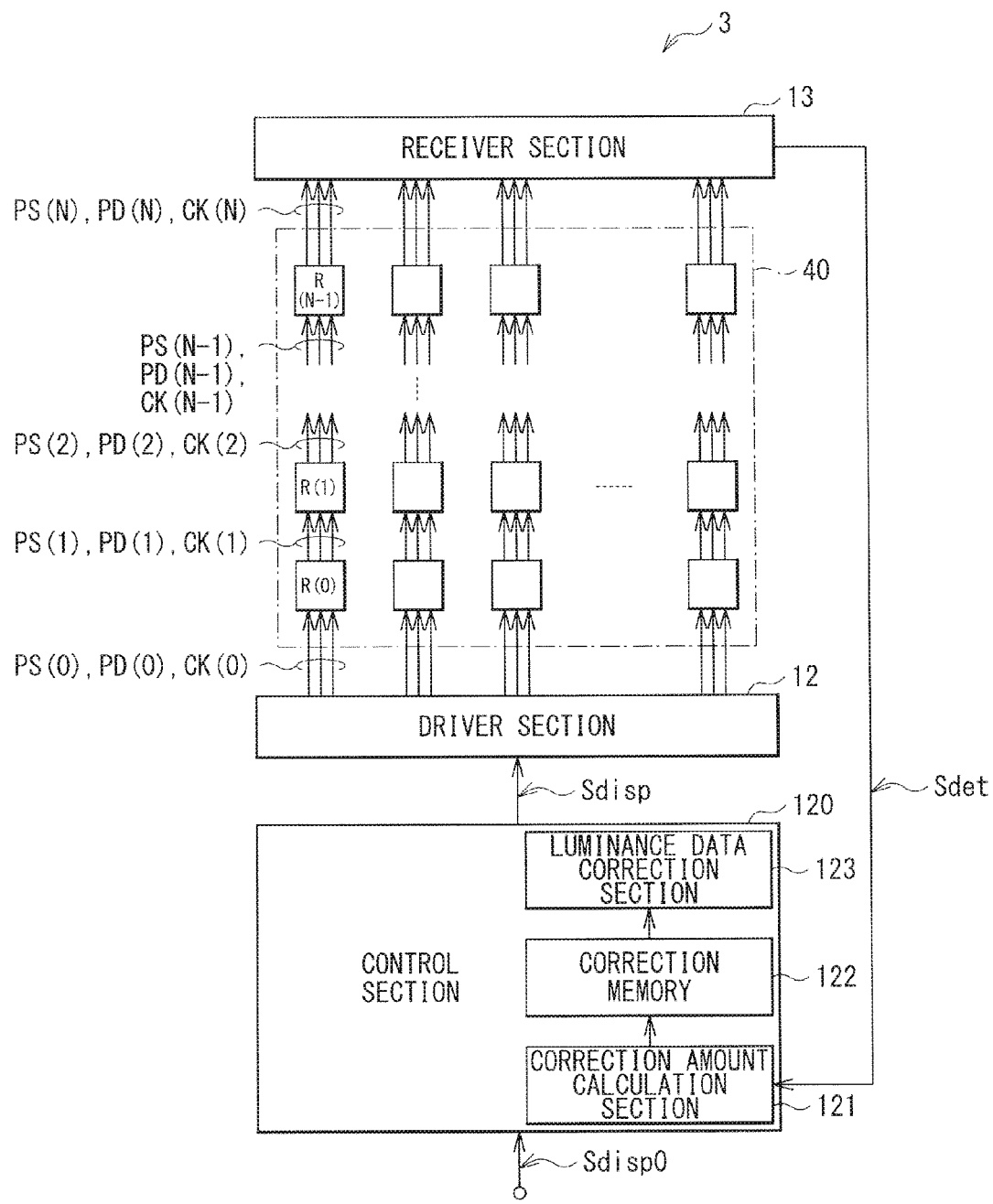
FIG. 21 is a block diagram illustrating a configuration example of a display panel according to a third embodiment.

FIG. 21 illustrates a configuration example of the display panel 3 according to this embodiment. The display panel 3 includes a display section 40 and a control section 120.

As with the display section 20, the display section 40 is configured to display an image, based on the data signals PS and PD and the clock signal CK and detect light. In the display section 40, pixels R are arranged in a matrix form. As illustrated in FIG. 21, N-number of pixels R (R(0) to R(N−1)) arranged side by side in a vertical direction are connected in a daisy chain fashion.

Figure 22:
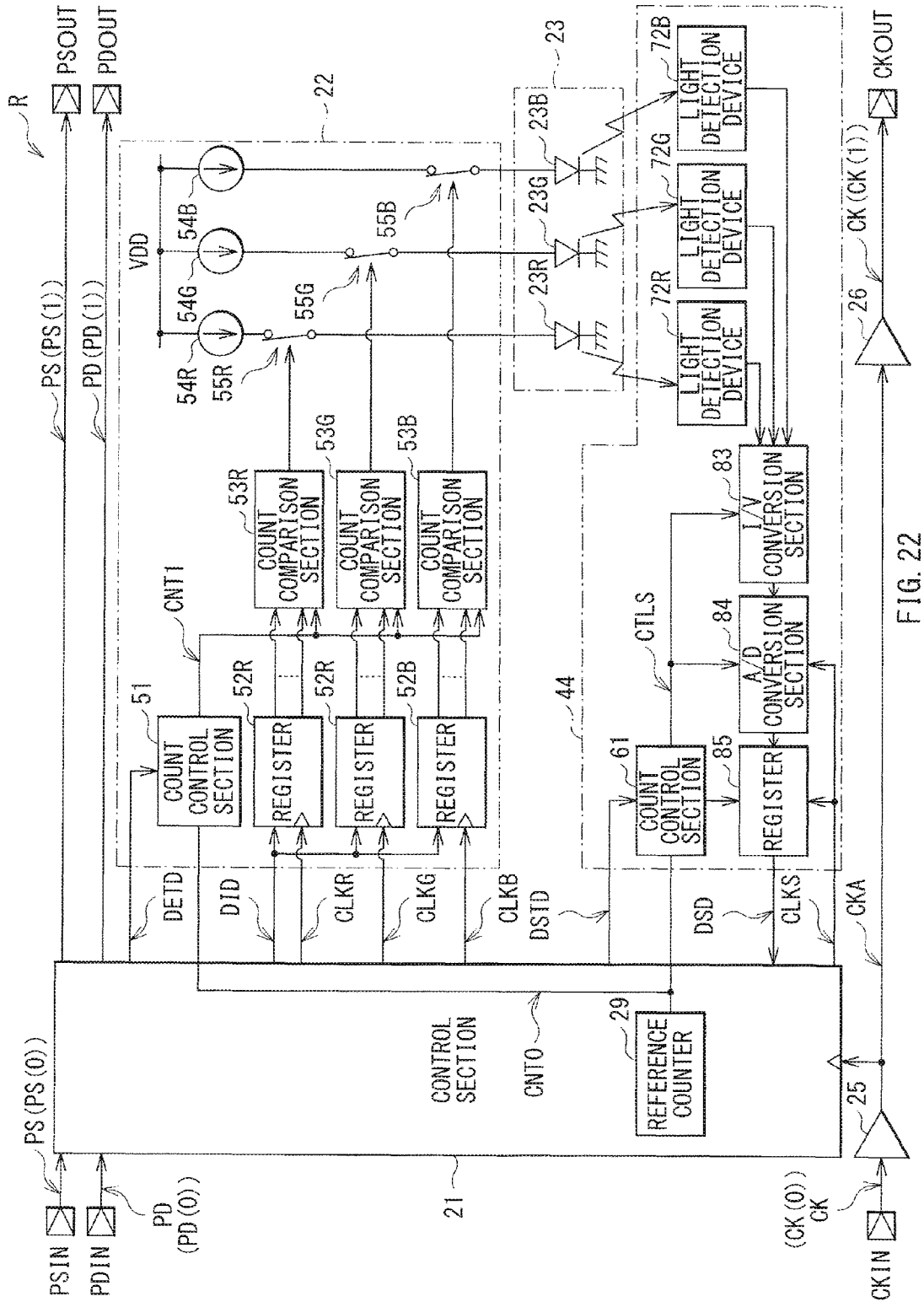
FIG. 22 is a block diagram illustrating a configuration example of a pixel illustrated in FIG. 21.

FIG. 22 illustrates a configuration example of the pixel R. The pixel R includes a light detection section 44. As with the light detection section 34 according to the above-described second embodiment, the light detection section 44 includes light detection devices 72R, 72G, and 72B. The light detection device 72R is configured to output a current according to intensity of red (R) light emitted from the light-emitting device 23R, the light detection device 72G is configured to output a current according to intensity of green (G) light emitted from the light-emitting device 23G, and the light detection device 72B is configured to output a current according to intensity of blue (B) light emitted from the light-emitting device 23B. The detection data SD stored in the register 85 includes detection results of these three light detection devices 72R, 72G, and 72B.

The control section 120 includes a correction amount calculation section 121, a correction memory 122, and a luminance data correction section 123. The correction amount calculation section 121 is configured to acquire degrees of changes in luminances of the light-emitting devices 23R, 23G, and 23B of each pixel R with time, based on the detection data SD of each pixel R included in the detection signal Sdet, and then calculates a correction amount of the luminance data ID in each pixel R, based on the degrees. In other words, the light-emitting devices 23R, 23G, and 23B may change luminances thereof with an increase in energizing time; therefore, the correction amount calculation section 121 acquires the degrees of changes in luminances of the light-emitting devices 23R, 23G, and 23B of each pixel R with time, and corrects the luminance in the pixel R, based on the degrees of the changes. The correction amount calculation section 121 performs this operation once per predetermined period (for example, once per day or month), and supplies the calculated correction amount to the correction memory 122. The correction memory 122 is configured to hold the correction amount of the luminance data ID in each pixel R. The luminance data correction section 123 is configured to correct the luminance data ID of each pixel R in the input image signal Sdisp0, based on the correction amount of the luminance data ID stored in the correction memory 122.

The pixel R corresponds to a specific example of "unit pixel" in an embodiment of the present disclosure. The luminance data correction section 123 corresponds to a specific example of "luminance data generation section" in an embodiment of the present disclosure.

Figure 23:
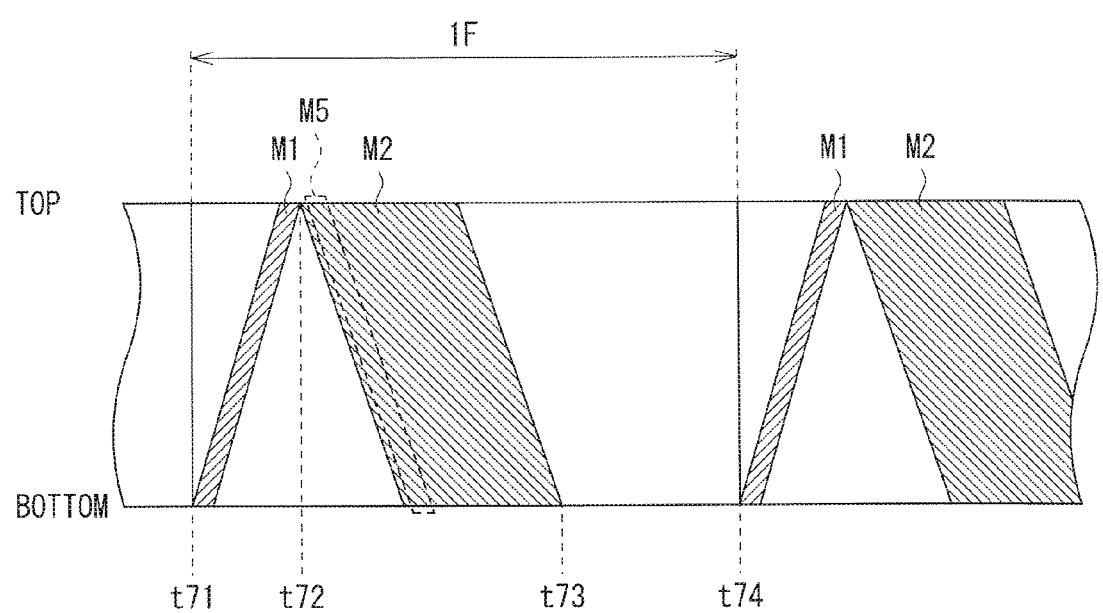
FIG. 23 is a timing chart illustrating an operation example of the display panel illustrated in FIG. 21.

FIG. 23 illustrates a timing chart of a display operation and an image acquisition operation in the display panel 3. In the display panel 3, for example, in one frame period (1 F), the transfer operation M1, the display operation M2, and a luminance acquisition operation M5 are performed. More specifically, as with the display panel 1 according to the above-described first embodiment (refer to FIG. 11), the display panel 3 first performs the transfer operation M1 in a period from a timing t71 to a timing t72, and performs the display operation M2 in a period from the timing t72 to a timing t73. Moreover, each of the pixels R of the display panel 3 performs the luminance acquisition operation M5 immediately after each of the pixels R starts the display operation M2. In other words, in the display operation M2, the light-emitting devices 23R, 23G, and 23B of each pixels R emit light in periods with lengths according to the luminance data IDR, IDG, and IDB from a timing according to the light emission timing data ETD, respectively; therefore, the luminance acquisition operation M5 is performed in a period immediately after the display operation M2 starts.

Thus, in this embodiment, the luminances of the light-emitting devices of each pixel are detected; therefore, a change in luminance in the display section with time is allowed to be corrected. Other effects are similar to those in the above-described first embodiment and the like.

Modification Example 3-1

The respective modification examples of the above-described first embodiment may be applied to the display panel 3 according to the above-described embodiment.

4. Fourth Embodiment

Next, a display panel 4 according to a fourth embodiment will be described below. The display panel 4 according to this embodiment has a function of correcting temperature dependence of luminance in the display section. It is to be noted that like components are denoted by like numerals as of the display panel 1 according to the above-described first embodiment and the like and will not be further described.

Figure 24:
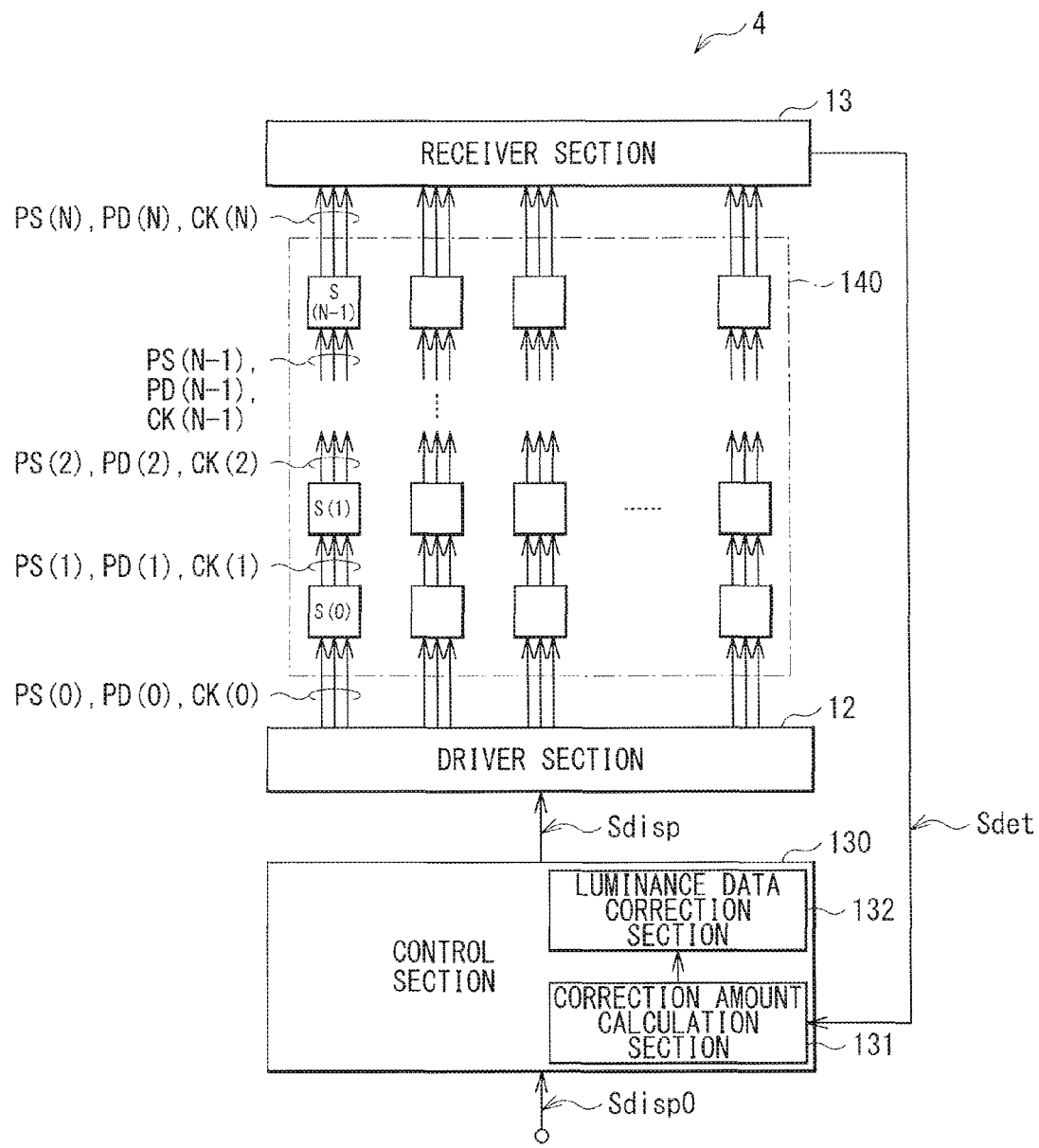
FIG. 24 is a block diagram illustrating a configuration example of a display panel according to a fourth embodiment.

FIG. 24 illustrates a configuration example of the display panel 4 according to this embodiment. The display panel 4 includes a display section 140 and a control section 130.

The display section 140 is configured to display an image, based on the data signals PS and PD and the clock signal CK and detect temperature. In the display section 140, pixels S are arranged in a matrix form. N-number of pixels S (S(0) to S(N−1)) arranged side by side in a vertical direction are connected in a daisy chain fashion.

Figure 25:
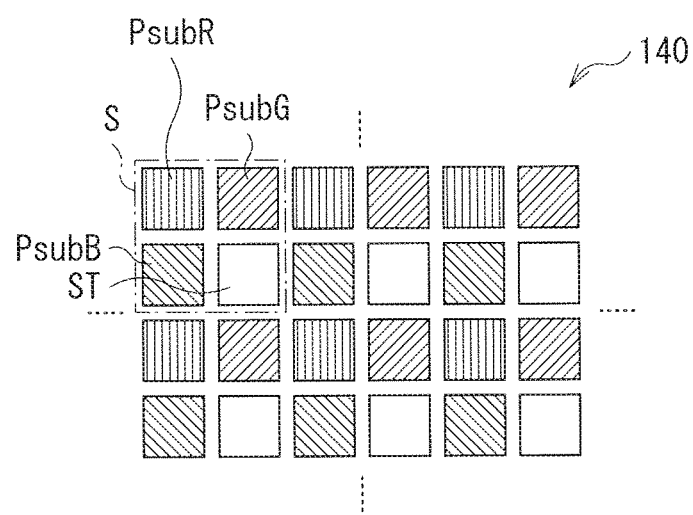
FIG. 25 is an explanatory diagram illustrating a configuration example of a display section illustrated in FIG. 24.

FIG. 25 illustrates a configuration example of the display section 140. Each of the pixels S includes three sub-pixels PsubR, PsubG, and PsubB, and a temperature sensor ST. The temperature sensor ST is configured to detect temperature. By this configuration, each of the pixels S performs the display operation with use of the three sub-pixels PsubR, PsubG, and PsubB, and performs a temperature detection operation with use of the temperature sensor ST.

Figure 26:
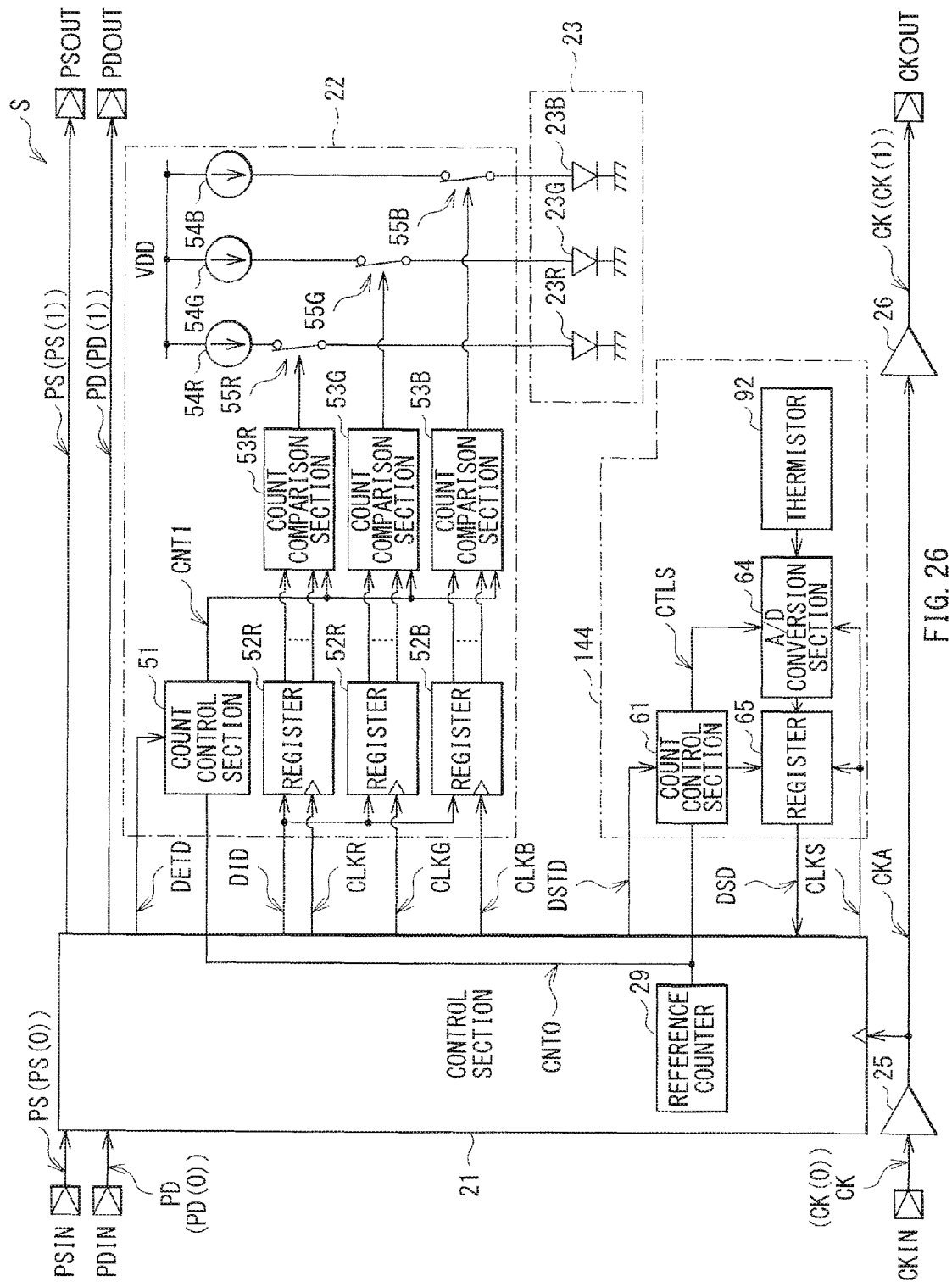
FIG. 26 is a block diagram illustrating a configuration example of a pixel illustrated in FIG. 24.

FIG. 26 illustrates a configuration example of the pixel S. The pixel S includes a temperature detection section 144. The temperature detection section 144 includes a thermistor 92. The thermistor 92 is configured to change electrical resistance with temperature, and corresponds to the temperature sensor ST illustrated in FIG. 25. In this example, the thermistor 92 generates a voltage value according to temperature by supplying a predetermined current to the thermistor 92 by a constant current source (not illustrated). The detection data SD stored in the register 65 includes a detection result of the thermistor 92.

The control section 130 includes a correction amount calculation section 131 and a luminance data correction section 132. The correction amount calculation section 131 is configured to acquire temperature in each pixel S, based on the detection data SD of each pixel S included in the detection signal Sdet and calculate a correction amount of the luminance data ID in each pixel S, based on the temperature. In other words, since luminances of the light-emitting devices 23R, 23G, and 23B may change with temperature, the correction amount calculation section 131 acquires temperature in each pixel S and corrects luminance in the pixel S, based on the temperature. The luminance data correction section 132 is configured to correct the luminance data ID of each pixel S in the input image signal Sdisp0, based on the correction amount of the luminance data ID acquired by the correction amount calculation section 131.

The pixel S corresponds to a specific example of "unit pixel" in an embodiment of the present disclosure. The luminance data correction section 132 corresponds to a specific example of "luminance data generation section" in an embodiment of the present disclosure.

Thus, in this embodiment, the temperature in each pixel is detected; therefore, temperature dependence of luminance in the display section is allowed to be corrected. Other effects are similar to those in the above-described first embodiment and the like.

Modification Example 4-1

The respective modification examples of the above-described first embodiment may be applied to the display panel 4 according to the above-described embodiment.

5. Application Examples

Next, application examples of the display panels described in the above-described embodiments and the above-described modification examples will be described below.

Figure 27:
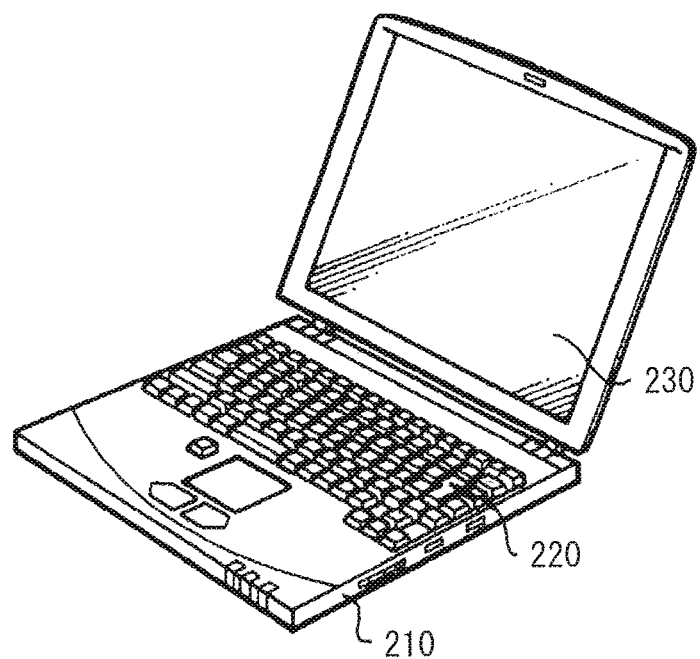
FIG. 27 is a perspective view illustrating an appearance of a notebook personal computer to which any of the embodiments and the like is applied.

FIG. 27 illustrates an appearance of a notebook personal computer to which any of the display panels according to the above-described embodiments and the like is applied. The notebook personal computer may include, for example, a main body 210, a keyboard 220, and a display section 230. Any one of the display panels according to the above-described embodiments and the like is applied to the display section 230.

Figure 28:
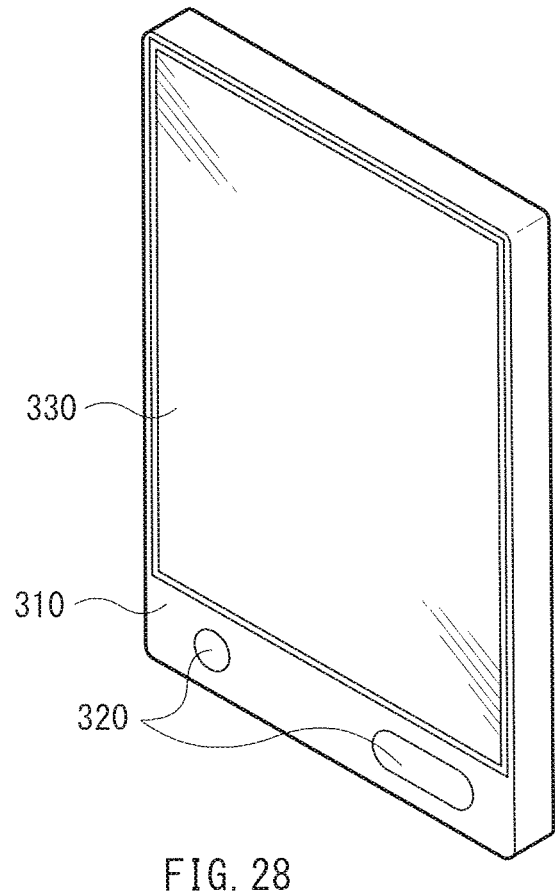
FIG. 28 is a perspective view illustrating an appearance of a smartphone to which any of the embodiments and the like is applied.

FIG. 28 illustrates an appearance of a smartphone to which any of the display panels according to the above-described embodiments and the like is applied. The smartphone may include, for example, a main body 310, an operation section 320, and a display section 330. Any one of the display panels according to the above-described embodiments and the like is applied to the display section 330.

In addition to such electronic apparatuses, the display panels according to the above-described embodiments and the like are applicable to electronic apparatuses in any fields such as monitors, televisions, digital cameras, video cameras, and large-screen displays installed in a soccer field, a baseball stadium, and the like. In other words, the display panels according to the above-described embodiments and the like are applicable to electronic apparatuses in any fields that are configured to display an image.

Although the present technology is described referring to the embodiments, the modification examples thereof, and the application examples thereof to electronic apparatuses, the present technology is not limited thereto, and may be variously modified.

For example, in the above-described embodiments and the like, the control data CD of the pixel packet PCT1 includes the light emission timing data ETD and the detection timing data STD; however, the present technology are not limited thereto, and the control data CD may include any other control data.

Moreover, for example, in the above-described embodiments and the like, the LED is used as a display device; however, the present technology is not limited thereto. Alternatively, an organic EL device may be used as a display device.

It is to be noted that the effects described in this description are merely examples; therefore, effects in the present technology are not limited thereto, and the present technology may have other effects.

It is to be noted that the present technology may have the following configurations.

(1) A display panel including:
a driver section configured to generate a first pixel packet including digital luminance data;
a plurality of unit pixels successively connected, each of the unit pixels configured to perform a display operation, based on the digital luminance data of the first pixel packet, and one or more of the unit pixels configured to perform a detection operation of a physical quantity thereof to generate a second pixel packet including digital detection data acquired by the detection operation and then output the second pixel packet to a subsequent one of the unit pixels; and a receiver section configured to receive the second pixel packet.

(2) The display panel according to (1), in which
the first pixel packet further includes flag data, and
each of the unit pixels determines, based on a value of the flag data, whether or not to read the digital luminance data included in the input first pixel packet.

(3) The display panel according to (2), in which
the flag data indicates a first flag value or a second flag value,
each of the unit pixels outputs the first pixel packet as-is when the flag data of the input first pixel packet indicates the first flag value, and
each of the unit pixels reads the digital luminance data included in the first pixel packet and generates the second pixel packet when the flag data of the input first pixel packet indicates the second flag value.

(4) The display panel according to (3), in which
the second pixel packet further includes flag data indicating the first flag value, and
each of the unit pixels sets, to the second flag value, flag data in the first pixel packet immediately after the second pixel packet is generated and output.

(5) The display panel according to any one of (1) to (4), in which the first pixel packet further includes first control data indicating a display operation start timing in one of the unit pixels.

(6) The display panel according to any one of (1) to (5), in which the first pixel packet further includes second control data indicating a detection operation start timing in one of the unit pixels.

(7) The display panel according to any one of (1) to (6), in which
the first pixel packet further includes flag data, and
each of the unit pixels includes a reference counter of which a count value is initialized, based on the flag data, and performs the display operation and the detection operation, based on the count value of the reference counter.

(8) The display panel according to any one of (1) to (7), in which each of the unit pixels includes a light detection device, and generates the digital detection data, based on a detection value by the light detection device.

(9) The display panel according to (8), in which the light detection device detects light when the unit pixel including the light detection device does not perform the display operation.

(10) The display panel according to (8), in which the light detection device detects light when the unit pixel including the light detection device performs the display operation.

(11) The display panel according to (8), in which
each of the unit pixels emits predetermined light, and
the light detection device detects light when the unit pixel including the light detection device emits the predetermined light.

(12) The display panel according to any one of (1) to (7), in which each of the unit pixels includes a temperature detection device, and generates the digital detection data, based on a detection value by the temperature detection device.

(13) The display panel according to any one of (8) to (12), further including a luminance data generation section, in which the receiver section supplies the digital detection data in the second pixel packet to the luminance data generation section, and the luminance data generation section generates digital luminance data of one or more of the plurality of unit pixels, and supplies the digital luminance data to the driver section.

(14) The display panel according to (13), in which the luminance data generation section generates, based on the digital detection data, digital luminance data in the unit pixel that generates the digital detection data.

(15) A driving method including:
generating a first pixel packet including digital luminance data; and
performing, by each of a plurality of unit pixels successively connected, a display operation, based on the digital luminance data of the first pixel packet, and performing, by one or more of the plurality of unit pixels, a detection operation of a physical quantity thereof to generate a second pixel packet including digital detection data acquired by the detection operation, and then outputting the second pixel packet to a subsequent one of the unit pixels.

(16) An electronic apparatus provided with a display panel and a control section configured to perform operation control on the display panel, the display panel including:
a driver section configured to generate a first pixel packet including digital luminance data;
a plurality of unit pixels successively connected, each of the unit pixels configured to perform a display operation, based on the digital luminance data of the first pixel packet, and one or more of the unit pixels configured to perform a detection operation of a physical quantity thereof to generate a second pixel packet including digital detection data acquired by the detection operation and then output the second pixel packet to a subsequent one of the unit pixels; and
a receiver section configured to receive the second pixel packet.

It should be understood by those skilled in the art that various modifications, combinations, sub-combinations, and alterations may occur depending on design requirements and other factors insofar as they are within the scope of the appended claims or the equivalents thereof.

What is claimed is:

1. A display panel comprising:
a first pixel that has a light sensor and a light-emitting device, the first pixel is configured to extract flag data from a first pixel packet and output a second pixel packet to a second pixel,
wherein the second pixel packet is the first pixel packet when the flag data is a first flag value, the light sensor is configured to detect light when the flag data is a second flag value, and
wherein the first pixel is configured to extract luminance data from the first pixel packet when the flag data is the second flag value, the luminance data defines a luminance of the light-emitting device.

2. The display panel according to claim 1, wherein the first pixel packet has a same number of bits as the second pixel packet.

3. The display panel according to claim 1, wherein the second pixel has another light sensor and another light-emitting device.

4. The display panel according to claim 1, wherein the light-emitting device is configured to radiate a light emission.

5. The display panel according to claim 1, wherein the light sensor is configured to generate detection data according to an amount of light received by the light sensor.

6. The display panel according to claim 5, wherein the first pixel inserts the detection data into the second pixel packet when the flag data is the flag value.

7. The display panel according to claim 1, further comprising:
   a receiver section configured to use the second pixel packet to generate a detection signal.

8. The display panel according to claim 7, further comprising:
   a control section configured to use the detection signal to generate a different pixel packet, the first pixel is configured to receive the different pixel packet.

9. An electronic apparatus comprising:
the display panel according to claim 1.

\* \* \* \* \*